(12) United States Patent
Hagiwara

(10) Patent No.: US 9,541,768 B2
(45) Date of Patent: Jan. 10, 2017

(54) ZOOM LENS AND ELECTRONIC APPARATUS

(71) Applicant: SAMSUNG ELECTRONICS CO., LTD., Suwon-si, Gyeonggi-do (KR)

(72) Inventor: Hiroyuki Hagiwara, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/479,629

(22) Filed: Sep. 8, 2014

(65) Prior Publication Data

US 2015/0070520 A1    Mar. 12, 2015

(30) Foreign Application Priority Data

Sep. 10, 2013 (JP) ................................. 2013-187717
Feb. 18, 2014 (KR) ........................ 10-2014-0018657

(51) Int. Cl.
| | |
|---|---|
| G02B 15/14 | (2006.01) |
| G02B 27/64 | (2006.01) |
| G02B 15/177 | (2006.01) |
| H04N 5/232 | (2006.01) |

(52) U.S. Cl.
CPC ........... *G02B 27/646* (2013.01); *G02B 15/177* (2013.01); *H04N 5/23248* (2013.01)

(58) Field of Classification Search
CPC ..... G02B 15/177; G02B 15/14; G02B 27/646; G02B 13/009; G02B 13/18; G02B 13/004; G02B 13/0045; H04N 5/23248

USPC .................................................. 359/684, 691
See application file for complete search history.

(56) References Cited

U.S. PATENT DOCUMENTS

| 8,659,836 B2 | 2/2014 | Imaoka | |
|---|---|---|---|
| 2012/0162778 A1 | 6/2012 | Imaoka | |
| 2013/0027585 A1 | 1/2013 | Souma | |
| 2014/0098253 A1* | 4/2014 | Maetaki | G02B 27/646 348/208.11 |

FOREIGN PATENT DOCUMENTS

| JP | 2001-116992 A | 4/2001 |
|---|---|---|
| JP | 2006-208889 A | 8/2006 |
| JP | 2009-014767 A | 1/2009 |
| JP | 2012-133228 A | 7/2012 |
| JP | 2012-133229 A | 7/2012 |
| JP | 2013-015778 A | 1/2013 |

\* cited by examiner

*Primary Examiner* — Alicia M Harrington
(74) *Attorney, Agent, or Firm* — Drinker Biddle & Reath LLP

(57) ABSTRACT

A zoom lens is described. The zoom lens includes, in an order from an object side: a first lens group that comprises at least two negative lenses and a single positive lens, the first lens group having a negative refractive power; a second lens group that comprises a plurality of lenses, at least one correction lens of the second lens group being movable in a surface that crosses an optical axis to perform image-shaking correction, the second lens group having a positive refractive power; a third lens group that comprises a single negative lens, the third lens group having a negative refractive power; and a fourth lens group having a positive refractive power.

21 Claims, 29 Drawing Sheets

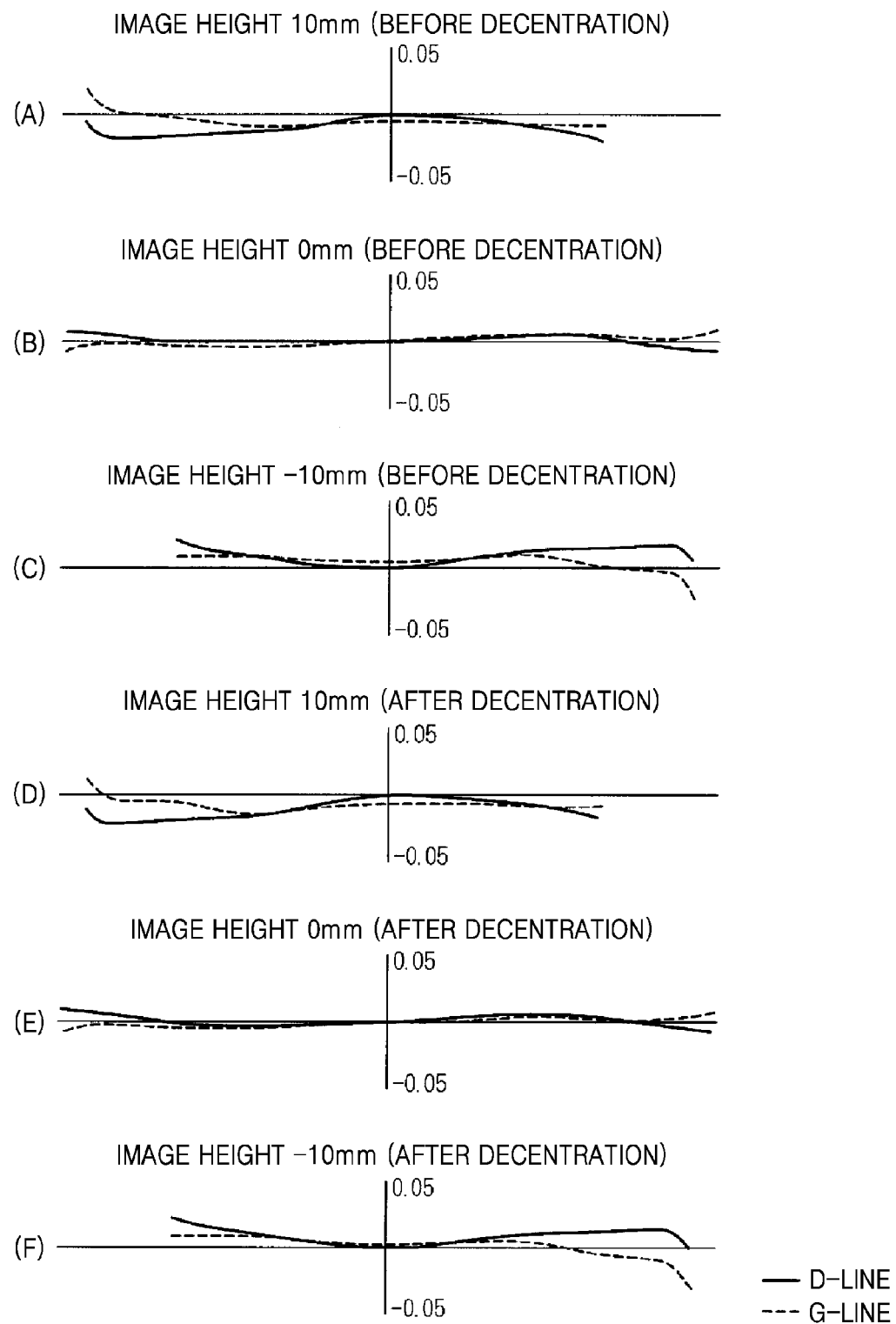

FIG. 4B
IMAGE HEIGHT 10mm (BEFORE DECENTRATION)
(A) 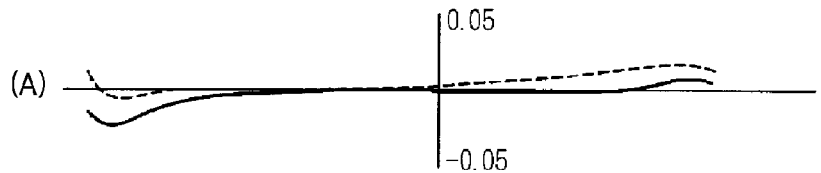
IMAGE HEIGHT 0mm (BEFORE DECENTRATION)
(B) 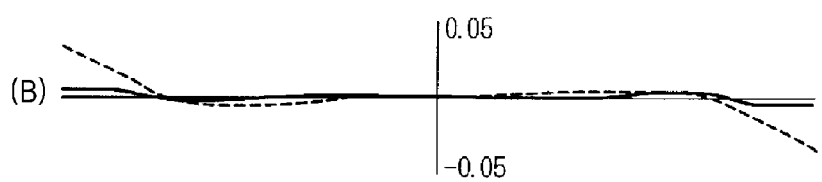
IMAGE HEIGHT -10mm (BEFORE DECENTRATION)
(C) 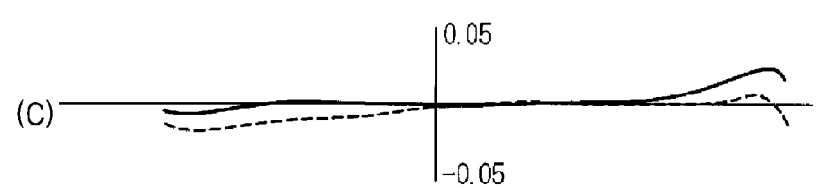
IMAGE HEIGHT 10mm (AFTER DECENTRATION)
(D) 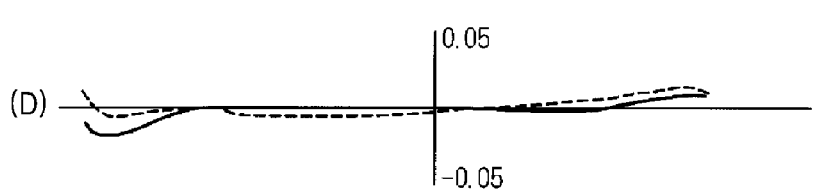
IMAGE HEIGHT 0mm (AFTER DECENTRATION)
(E) 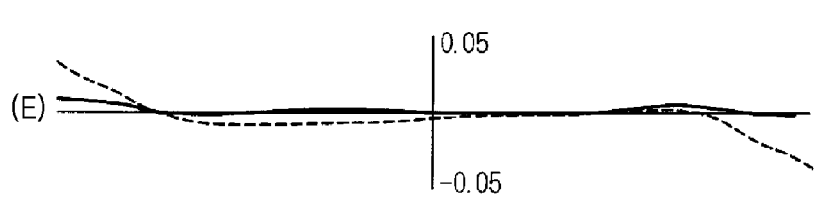
IMAGE HEIGHT -10mm (AFTER DECENTRATION)
(F) 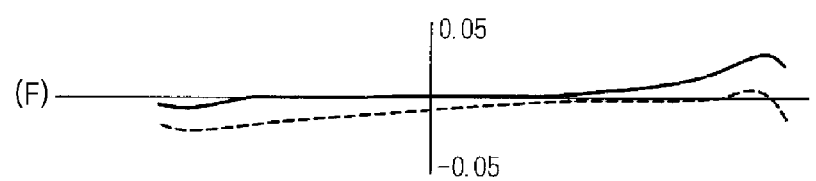
—— D-LINE
--- G-LINE

FIG. 7B
IMAGE HEIGHT 10mm (BEFORE DECENTRATION)
(A) 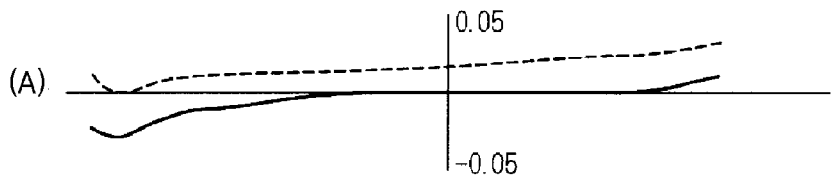
IMAGE HEIGHT 0mm (BEFORE DECENTRATION)
(B) 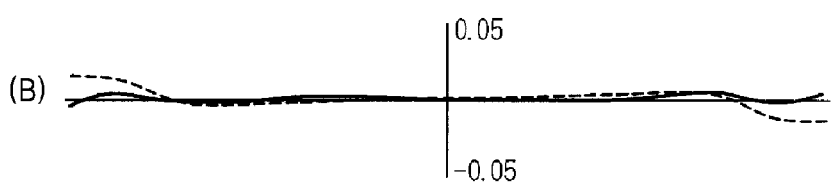
IMAGE HEIGHT −10mm (BEFORE DECENTRATION)
(C) 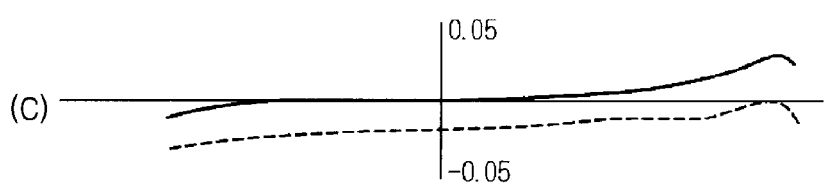
IMAGE HEIGHT 10mm (AFTER DECENTRATION)
(D) 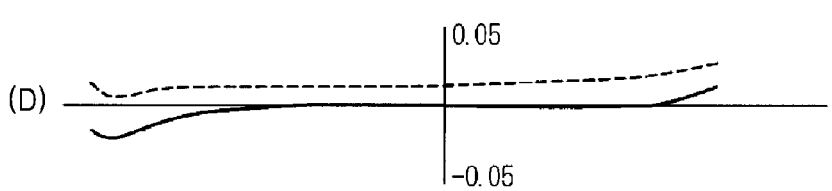
IMAGE HEIGHT 0mm (AFTER DECENTRATION)
(E) 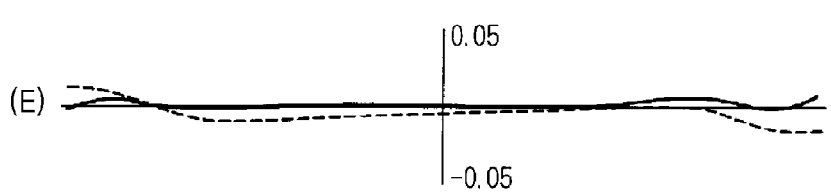
IMAGE HEIGHT −10mm (AFTER DECENTRATION)
(F) 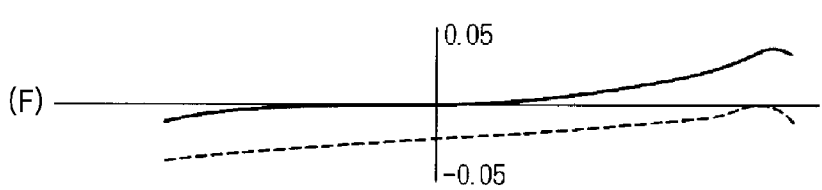
—— D-LINE
--- G-LINE

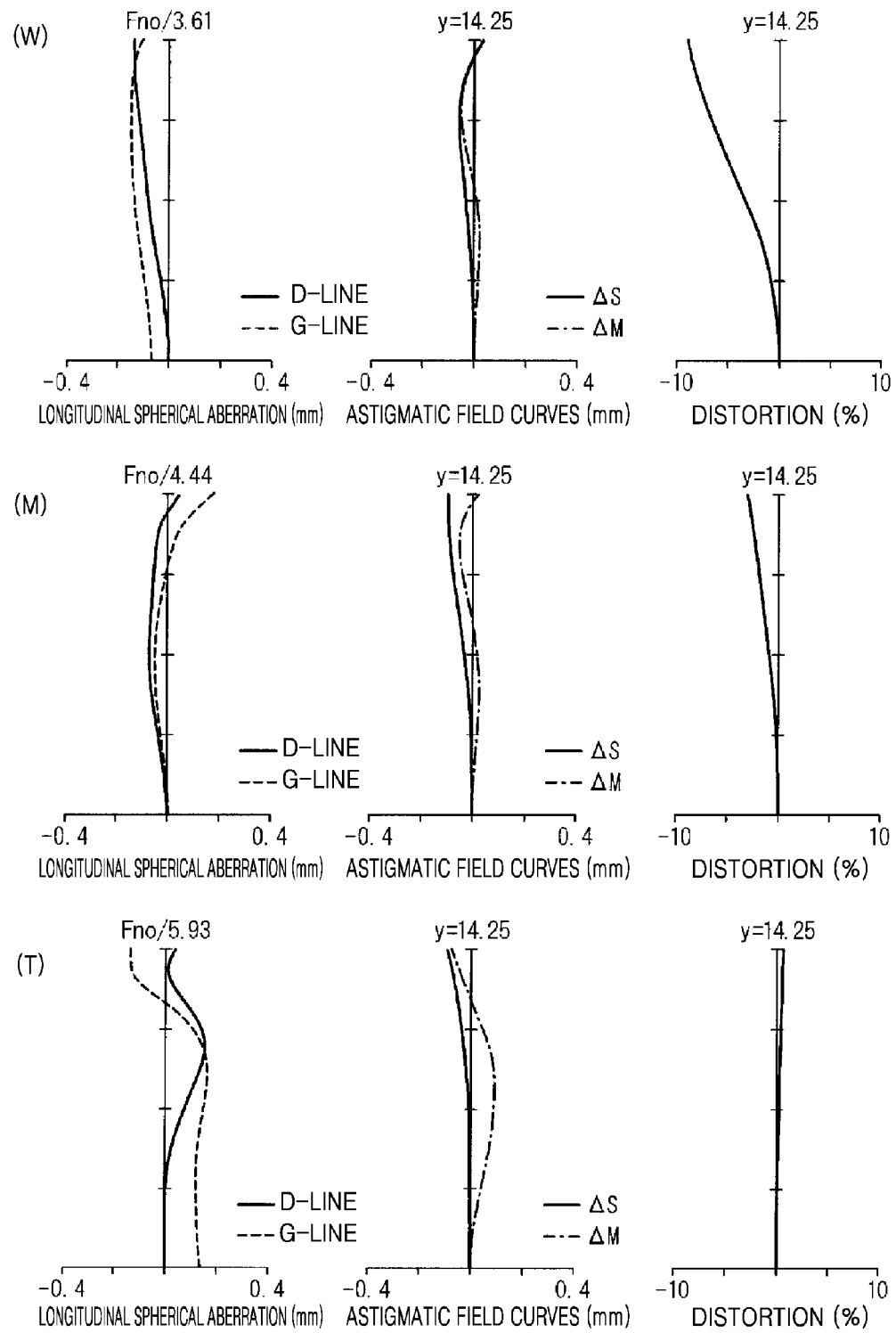

FIG. 10B
IMAGE HEIGHT 10mm (BEFORE DECENTRATION)
(A) 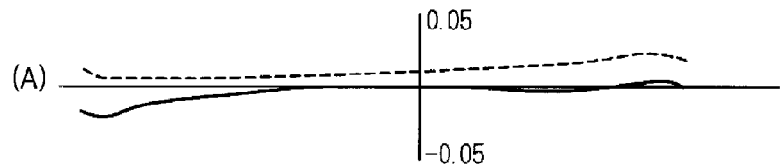
IMAGE HEIGHT 0mm (BEFORE DECENTRATION)
(B) 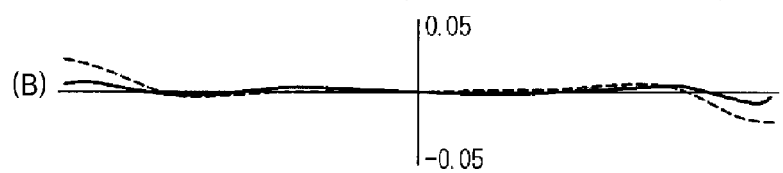
IMAGE HEIGHT −10mm (BEFORE DECENTRATION)
(C) 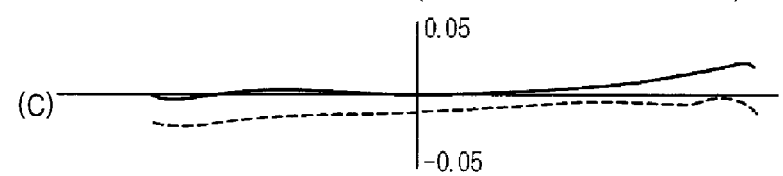
IMAGE HEIGHT 10mm (AFTER DECENTRATION)
(D) 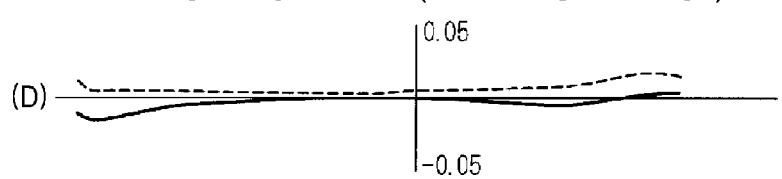
IMAGE HEIGHT 0mm (AFTER DECENTRATION)
(E) 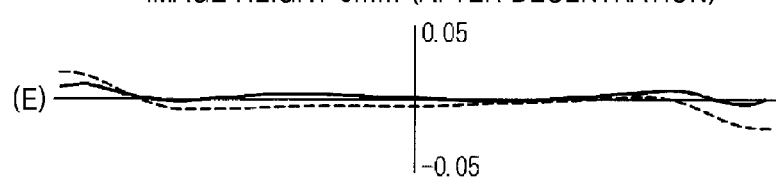
IMAGE HEIGHT −10mm (AFTER DECENTRATION)
(F) 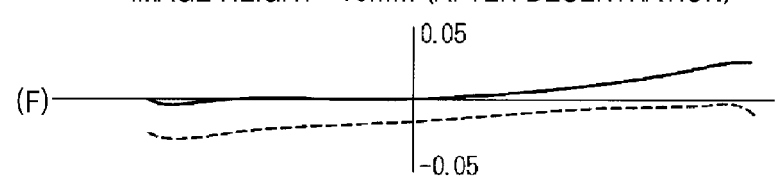
— D-LINE
--- G-LINE

FIG. 16A
IMAGE HEIGHT 10mm (BEFORE DECENTRATION)
(A) 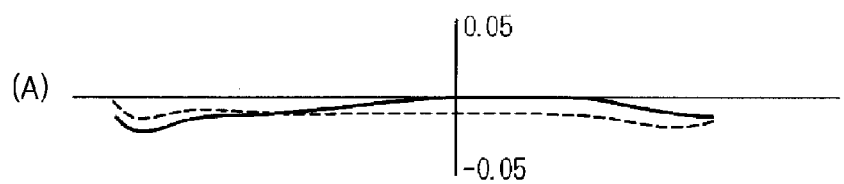
IMAGE HEIGHT 0mm (BEFORE DECENTRATION)
(B) 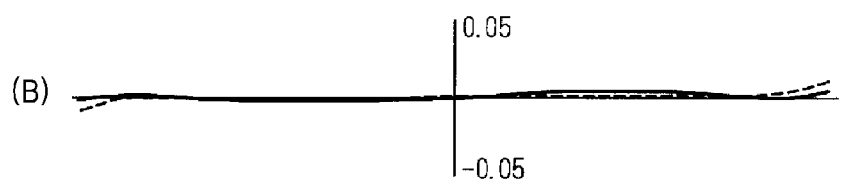
IMAGE HEIGHT −10mm (BEFORE DECENTRATION)
(C) 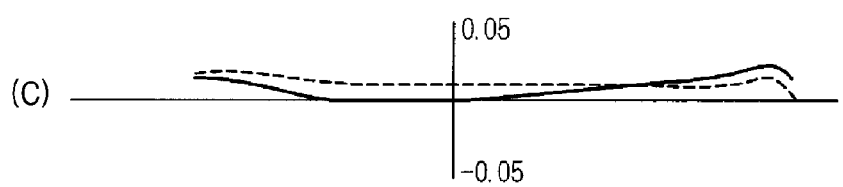
IMAGE HEIGHT 10mm (AFTER DECENTRATION)
(D) 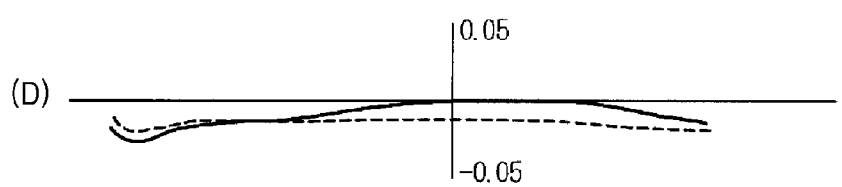
IMAGE HEIGHT 0mm (AFTER DECENTRATION)
(E) 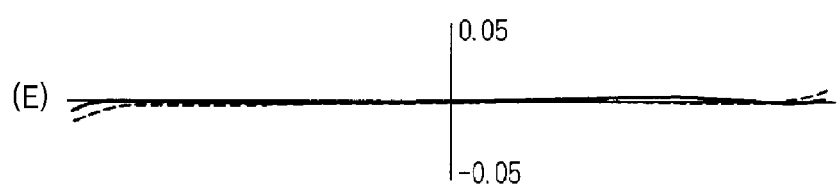
IMAGE HEIGHT −10mm (AFTER DECENTRATION)
(F) 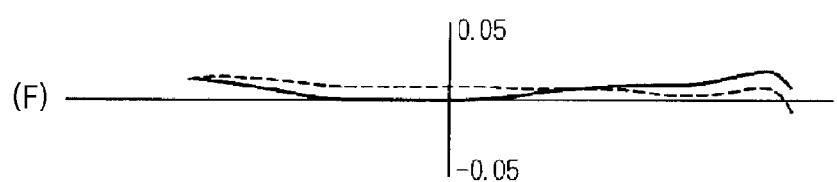
——— D-LINE
--- G-LINE

FIG. 19A
IMAGE HEIGHT 10mm (BEFORE DECENTRATION)
(A) 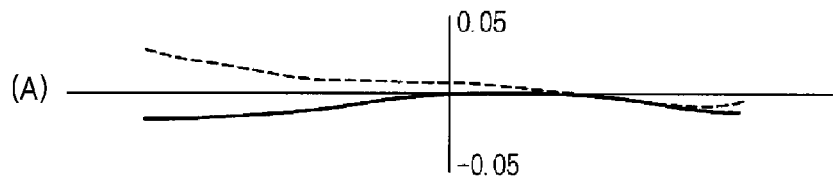
IMAGE HEIGHT 0mm (BEFORE DECENTRATION)
(B) 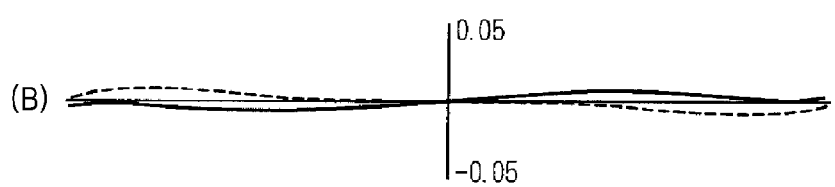
IMAGE HEIGHT -10mm (BEFORE DECENTRATION)
(C) 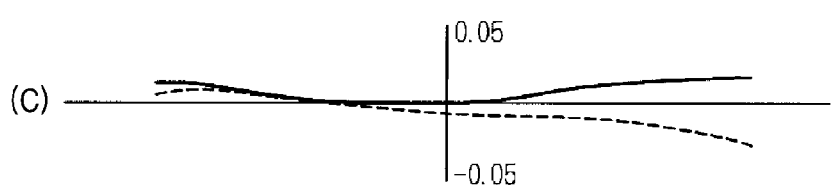
IMAGE HEIGHT 10mm (AFTER DECENTRATION)
(D) 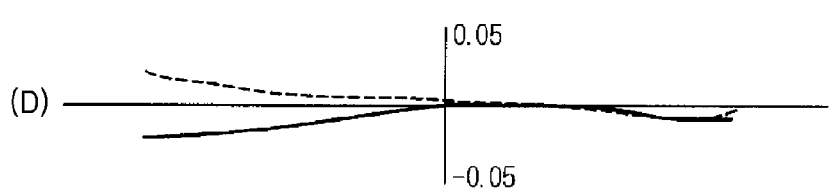
IMAGE HEIGHT 0mm (AFTER DECENTRATION)
(E) 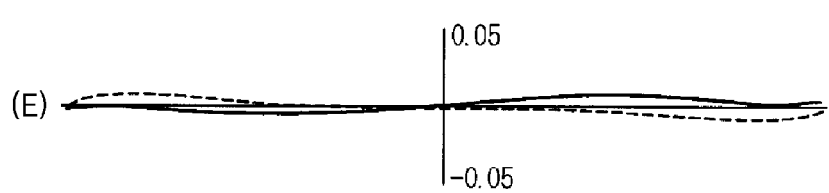
IMAGE HEIGHT -10mm (AFTER DECENTRATION)
(F) 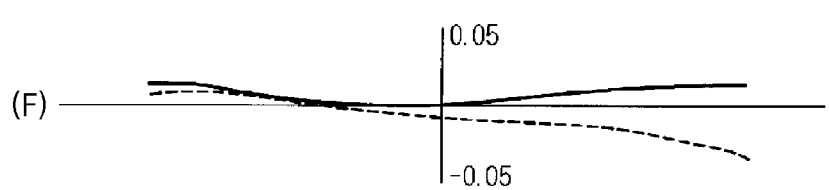
—— D-LINE
--- G-LINE

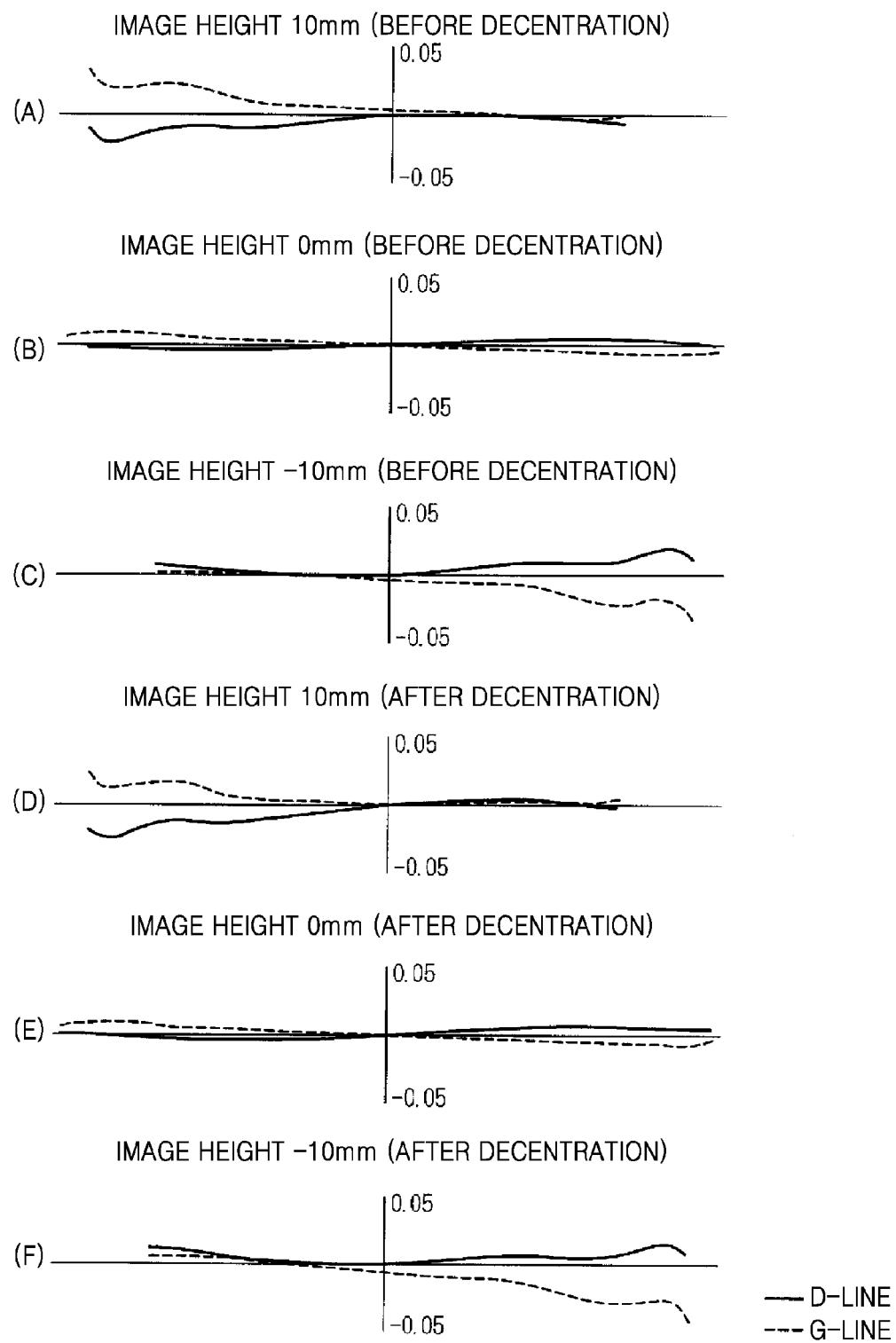

FIG. 22B
IMAGE HEIGHT 10mm (BEFORE DECENTRATION)
(A) 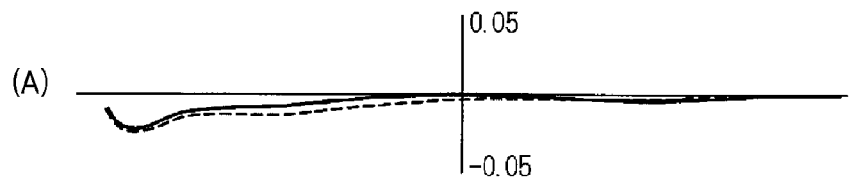
IMAGE HEIGHT 0mm (BEFORE DECENTRATION)
(B) 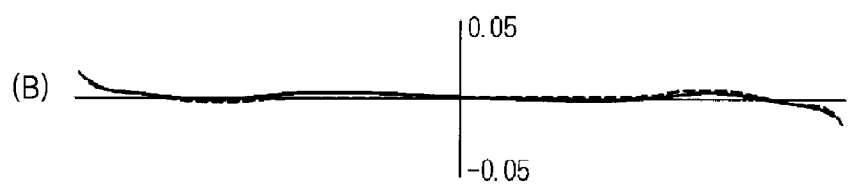
IMAGE HEIGHT −10mm (BEFORE DECENTRATION)
(C) 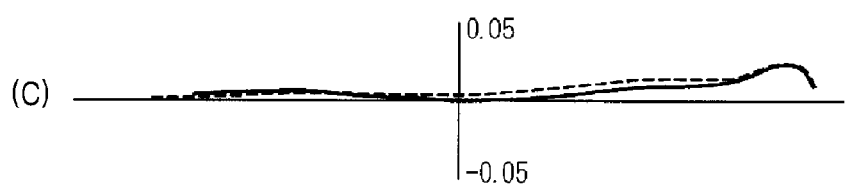
IMAGE HEIGHT 10mm (AFTER DECENTRATION)
(D) 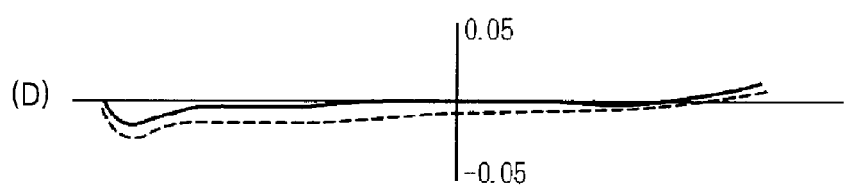
IMAGE HEIGHT 0mm (AFTER DECENTRATION)
(E) 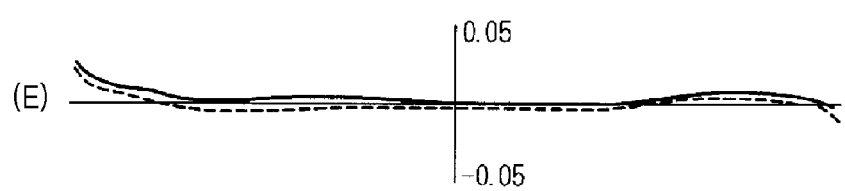
IMAGE HEIGHT −10mm (AFTER DECENTRATION)
(F) 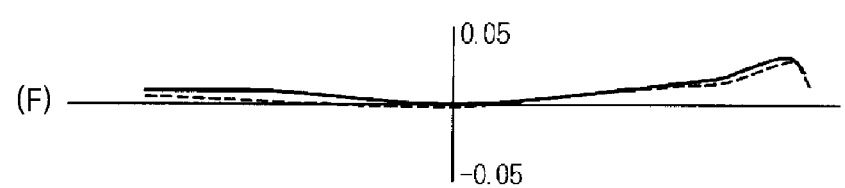
—— D-LINE
--- G-LINE

ZOOM LENS AND ELECTRONIC APPARATUS

CROSS-REFERENCE TO RELATED PATENT APPLICATIONS

This application claims the priority benefit of Japanese Patent Application No. 2013-187717, filed on Sep. 10, 2013, in the Japan Patent Office, and Korean Patent Application No. 10-2014-0018657, filed on Feb. 18, 2014, in the Korean Intellectual Property Office, the disclosures of which are incorporated by reference herein in their entirety.

BACKGROUND

1. Field

Various embodiments of the present disclosure relate to a zoom lens and an electronic apparatus.

2. Related Art

Imaging apparatuses using solid-state imaging devices, such as a charge-coupled device (CCD) type image sensor and a complementary metal-oxide semiconductor (CMOS) type image sensor, have been widely used. These imaging apparatuses include digital still cameras, video cameras, and interchangeable lens cameras. Also, the imaging apparatuses using the solid-state imaging devices are appropriate for miniaturization, and thus, in recent years, the imaging apparatuses have been applied to small information terminals such as cellular phones and smartphones. Users demand high performance imaging apparatuses, for example, in terms of high resolution and a wide viewing angle. Also, consumer expertise with respect to cameras has been continuously increasing.

A negative lead type zoom lens in which a lens group having a negative refractive power overall is in a lead position may relatively easily achieve a wide angle and miniaturization of diameters of lenses in the lead position, and thus, it is widely used.

In such a negative lead type zoom lens, high optical performance is desired during zooming from a wide angle position to a telephoto position.

SUMMARY

Various embodiments of the present disclosure include a zoom lens having a high zooming rate and capable of appropriately correcting aberration generated due to a shift of an image plane during zooming and image-shaking correction.

One or more embodiments of the present disclosure include a compact and light-weight zoom lens.

One or more embodiments of the present disclosure include an electronic apparatus including a zoom lens having a high zooming rate and being capable of appropriately correcting aberration generated due to a shift of an image plane during zooming and image-shaking correction.

One of more embodiments of the present disclosure include an electronic apparatus including a compact and light-weight zoom lens.

Additional embodiments will be set forth in part in the description which follows and, in part, will be apparent from the description, or may be learned by practice of the presented embodiments.

According to one or more embodiments, a zoom lens includes, in an order from an object side: a first lens group that comprises at least two negative lenses and a single positive lens, the first lens group having a negative refractive power; a second lens group that comprises a plurality of lenses, at least one correction lens of the second lens group being movable in a surface that crosses an optical axis to perform image-shaking correction, the second lens group having a positive refractive power; a third lens group that comprises a single negative lens, the third lens group having a negative refractive power; and a fourth lens group having a positive refractive power, wherein intervals between the first, second, third, and fourth lens groups are changed during zooming from a wide angle position to a telephoto position, and the zoom lens satisfies the following conditions:

$$0.05 < M_4/M_2 < 1.0, \text{ and}$$

$$0.8 < f_4/f_t < 5.0,$$

where $M_2$ denotes an amount of movement of the second lens group in a direction toward the optical axis during zooming from the wide angle position to the telephoto position, $M_4$ denotes an amount of movement of the fourth lens group in a direction toward the optical axis during zooming from the wide angle position to the telephoto position, $f_4$ denotes a synthesis focal length of the fourth lens group, and $f_t$ denotes an overall focal length in the telephoto position.

The correction lens, which may be located most adjacent to an image side within the second lens group, may be moved in the surface that crosses the optical axis to perform the image-shaking correction.

The correction lens, which may be located in a third position in an order from the object side, may be moved in the surface that crosses the optical axis to perform the image-shaking correction.

The negative lens of the third lens group may be a biconcave lens.

The negative lens of the third lens group may have at least one aspherical surface.

The fourth lens group may include a single positive lens.

The positive lens of the fourth lens group may be a meniscus lens that is convex at an image side.

The zoom lens may satisfy the following conditions:

$$1.65 < nd_3, \text{ and}$$

$$0.005 < nd_3 - nd_4,$$

where $nd_3$ denotes a refractive index of the negative lens of the third lens group at a d-line and $nd_4$ denotes a refractive index of the positive lens of the fourth lens group at a d-line.

The zoom lens may satisfy the following condition:

$$0.55 < M_3/M_2 < 1.0,$$

where $M_2$ denotes the amount of movement of the second lens group in the direction toward the optical axis during zooming from the wide angle position to the telephoto position and $M_3$ denotes an amount of movement of the third lens group in the direction toward the optical axis during zooming from the wide angle position to the telephoto position.

The zoom lens may satisfy the following condition:

$$0.1 < |f_3/f_t| < 0.8,$$

where $f_3$ denotes a focal length of the third lens group and $f_t$ denotes the overall focal length in the telephoto position.

The second lens group may include in an order from the object side a first lens having a positive refractive power, a second lens having a positive refractive power, and a third lens having a positive refractive power.

The zoom lens may satisfy the following condition:

$$0.1 < f_2/f_t < 0.8,$$

where $f_2$ denotes a focal length of the second lens group and $f_t$ denotes the overall focal length in the telephoto position.

The first lens of the second lens group may be a biconvex lens and may have at least one aspherical surface.

The second lens of the second lens group may be a cemented lens including in an order from the object side a negative lens and a positive lens.

The zoom lens may satisfy the following condition:

$$2.0 < f_5/f_2 < 20.0,$$

where $f_5$ denotes a focal length of the second lens of the second lens group and $f_t$ denotes the overall focal length in the telephoto position.

An aperture stop may be disposed between the first lens of the second lens group and the second lens of the second lens group.

The first lens group may include in an order from the object side a negative lens that is convex toward the object side, a biconcave negative lens, and a positive lens which is convex toward the object side.

At least one of the lenses included in the first lens group may be an aspherical lens.

The zoom lens may satisfy the following condition:

$$0.2 < |f_1/f_t| < 0.8,$$

where $f_1$ denotes a focal length of the first lens group and $f_t$ denotes the overall focal length in the telephoto position.

According to one or more embodiments, an electronic apparatus includes a zoom lens and a solid-state imaging device that captures an image formed by the zoom lens. The zoom lens includes, in an order from an object side: a first lens group that comprises at least two negative lenses and a single positive lens, the first lens group having a negative refractive power; a second lens group that comprises a plurality of lenses, at least one correction lens of the second lens group being movable in a surface that crosses an optical axis to perform image-shaking correction, the second lens group having a positive refractive power; a third lens group that comprises a single negative lens, the third lens group having a negative refractive power; and a fourth lens group having a positive refractive power, wherein intervals between the first, second, third, and fourth lens groups are changed during zooming from a wide angle position to a telephoto position, and the zoom lens satisfies the following conditions:

$$0.05 < M_4/M_2 < 1.0, \text{ and}$$

$$0.8 < f_4/f_t < 5.0,$$

where $M_2$ denotes an amount of movement of the second lens group in a direction toward the optical axis during zooming from the wide angle position to the telephoto position, $M_4$ denotes an amount of movement of the fourth lens group in a direction toward the optical axis during zooming from the wide angle position to the telephoto position, $f_4$ denotes a synthesis focal length of the fourth lens group, and $f_t$ denotes an overall focal length in the telephoto position.

BRIEF DESCRIPTION OF THE DRAWINGS

These and/or other embodiments will become apparent and more readily appreciated from the following description of various embodiments, taken in conjunction with the accompanying drawings in which:

FIG. 4A illustrates lateral aberration of the zoom lens of FIG. 1 in a wide angle position (W);

FIG. 4B illustrates lateral aberration of the zoom lens of FIG. 1 in a telephoto position (T);

FIG. 7B illustrates lateral aberration of the zoom lens of FIG. 5 in a telephoto position (T);

FIG. 9 illustrates spherical aberration, astigmatic field curves, and distortion of the zoom lens of FIG. 8 in a wide angle position (W), a middle position (M), and a telephoto position (T);

FIG. 10B illustrates lateral aberration of the zoom lens of FIG. 8 in a telephoto position (T);

FIG. 16A illustrates lateral aberration of the zoom lens of FIG. 14 in a wide angle position (W);

FIG. 19A illustrates lateral aberration of the zoom lens of FIG. 17 in a wide angle position (W);

FIG. 22A illustrates lateral aberration of the zoom lens of FIG. 20 in a wide angle position; and FIG. 22B illustrates lateral aberration of the zoom lens of FIG. 20 in a telephoto position.

DETAILED DESCRIPTION

Figure 1:
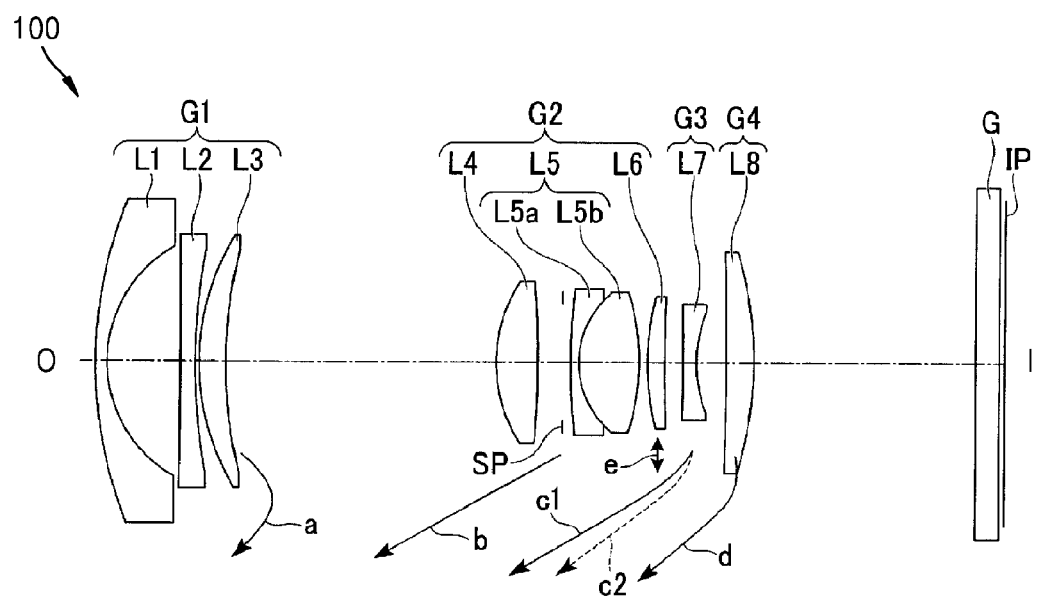
FIG. 1 is a view of a zoom lens according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various features of the present description. Expressions such as "at least one of," when preceding a list of elements, modify the entire list of elements and do not modify the individual elements of the list.

FIG. 1 is a view of a zoom lens 100 according to an embodiment.

The zoom lens 100 according to the present embodiment may be used as an imaging optical system of an electronic apparatus, such as an interchangeable lens system camera, digital still camera, digital video camera, surveillance camera, or other imaging apparatus.

The zoom lens 100 illustrated in FIG. 1 includes, in an order from an object side O to an image side I, a first lens group G1 having a negative refractive power, a second lens group G2 having a positive refractive power, a third lens group G3 having a negative refractive power, and a fourth lens group G4 having a positive refractive power. That is, the zoom lens 100 may be a type of a zoom lens of four groups respectively having negative, positive, negative, and positive refractive powers from the object side O to the image side I.

The first lens group G1 may include at least two negative lenses and a single positive lens. For example, the first lens group G1 may include in an order from the object side O, a negative lens L1 that is convex toward the object side, a negative lens L2 that has two concave surfaces, and a positive lens L3 that is convex toward the object side. At least one of the lenses included in the first lens group G1 may be an aspherical lens. For example, at least one surface of the at least one of the negative lens L1, the negative lens L2, and the positive lens L3 may be aspherical.

The first lens group G1 may provide a negative refractive power due to the at least two negative lenses L1 and L2 and may appropriately correct coma aberration and distortion in a wide angle position. Also, the negative lens L2, which is arranged in a second position from the object side O, may be formed as a biconcave lens to appropriately correct coma aberration in the wide angle position.

Chromatic aberration generated in the first lens group G1 or spherical aberration in a telephoto position may be appropriately corrected by the positive lens L3 of the first lens group G1.

At least one of the lenses included in the first lens group G1 may be formed as an aspherical lens to appropriately correct astigmatic field curves in the wide angle position or spherical aberration in the telephoto position. Also, for example, the negative lens L2 may include an aspherical surface to reduce the size of the negative lens L2.

The second lens group G2 may include, in an order from the object side O, a lens L4 having a positive refractive power, a lens L5 having a positive refractive power, and a lens L6 having a positive refractive power.

The second lens group G2 is a main lens group for performing zooming. The second lens group G2 has a positive refractive power so that an overall length of the zoom lens 100 may be reduced. The second lens group G2 may include three positive lenses (L4, L5, and L6) to provide a strong positive refractive power. In the zoom lens 100 according to the present embodiment, spherical aberration may be appropriately corrected and the overall length of the zoom lens 100 may be reduced, by using the three positive lenses.

The lens L4 may be a biconvex lens. At least one surface of the lens L4 may be an aspherical surface. The lens L5 may be formed as a cemented lens in which a negative lens L5a and a positive lens L5b are cemented in order from the object side O. The lens L6 may have a convex shape toward the object side O.

In the zoom lens 100 of the four groups G1, G2, G3, and G4 having negative, positive, negative, and positive refractive powers, respectively, an axial bundle of light rays gets expanded at the object side O of the second lens group G2, and thus, spherical aberration may be generated in the lens L4 that is arranged most adjacent to the object side O. Accordingly, at least one surface of the lens L4 may be formed to be aspherical to appropriately correct spherical aberration. Also, the lens L4 may be formed as a biconvex lens to achieve miniaturization of the zoom lens 100.

The lens L5 may include the negative lens L5a at the object side O to prevent chromatic aberration generated in the lens L4. Also, spherical aberration may be appropriately corrected on a cemented surface of the negative lens L5a and the positive lens L5b forming the cemented lens.

The negative lens L5a of the lens L5 may have a convex surface at the object side O. For example, the negative lens L5a of the lens L5 may be a meniscus lens that is convex toward the object side O. Also, an opening aperture stop SP disposed between the lens L4 and the lens L5 may restrict an aperture. In addition, an overall length of the second lens group G2 may be reduced, that is, a retracting thickness may be reduced when storing the zoom lens 100 by retracting a lens barrel. Accordingly, the storage size of the zoom lens 100 may be reduced.

The lens L6 may have a convex surface toward the object side O. For example, the lens L6 may be a meniscus lens that is convex toward the object side O and may be made to be light-weight. The lens L6 may correct image-shaking. When the lens L6 is made to be light-weight, a device for correcting image-shaking may be miniaturized.

The third lens group G3 may include a single negative lens L7. Also, the negative lens L7 may be a biconcave lens. The negative lens L7 may include at least one aspherical surface.

In the zoom lens 100 according to the present embodiment, the zoom lens 100 is made to be light-weight by forming the third lens group G3 by using the single negative lens L7. Also, the third lens group G3 may perform focusing. As the third lens group G3 is made to be light-weight, a lens operating device for focusing may be miniaturized.

The third lens group G3 may appropriately correct various aberrations generated due to shifts during zooming and focusing, such as coma aberration, by using an aspherical surface. Also, the negative lens L7 may be formed as a biconcave lens to disperse the negative refractive power to an object side surface and an image side surface. Therefore, astigmatic field curves and coma aberration due to decentering may be prevented.

The fourth lens group G4 may include a single positive lens L8. The positive lens L8 may include a convex image side surface. The positive lens L8 may be, for example, a meniscus lens that is convex toward the image side I. The positive lens L8 may include at least one aspherical surface.

In the zoom lens 100 according to the present embodiment, the fourth lens group G4 may be formed of a single lens, and thus, it may be made to be light-weight. Also, at least one surface of the positive lens L8 of the fourth lens group G4 may be formed to be aspherical to appropriately correct astigmatic field curves during zooming from a wide angle position to a telephoto position. Also, the positive lens L8 may be formed as the meniscus lens to prevent a ghost image that may be generated because a light flux reflected by the positive lens L8 is again incident in an imaging surface of a solid-state imaging device, when the light flux reflected by the imaging surface of the solid-state imaging device or an optical filter is incident in the positive lens L8.

The opening aperture stop SP may be disposed between the lens L4 and the lens L5 forming the second lens group G2. The opening aperture stop SP may restrict an amount of light flux (or quantity of light) that is incident on an image plane IP side from the object side O.

In the zoom lens 100 according to the present embodiment, the negative first lens group G1 and the negative third lens group G3 are arranged having the opening aperture stop SP at the center therebetween so that off-axial aberration may be easily corrected. Also, according to a telephoto effect by the negative third lens group G3 in the telephoto position, an overall optical length of the telephoto position may be reduced.

An optical block G may be disposed between the fourth lens group G4 and an image plane IP. The optical block G may be, for example, an optical filter, a phase plate, a crystal low pass filter, or an infrared-cut filter.

In the electronic apparatus including the zoom lens 100 and a solid-state imaging device according to the present embodiment, the image plane IP may correspond to an imaging surface of the solid-state imaging device. The solid-state imaging device may use a photoelectric conversion element, such as a charge coupled device (CCD) sensor and a complementary metal-oxide semiconductor device (CMOS) sensor.

In the electronic apparatus, light incident from the object side O of the zoom lens 100 according to the present embodiment ultimately forms an image on the imaging surface of the solid-state imaging device. Then, the electronic apparatus may photoelectrically convert the light received by the solid-state imaging device, output the converted light as an electrical signal, and generate a digital image corresponding to an image of an object. The digital image may be recorded on a recording medium (not shown), such as a hard disk drive (HDD), a memory card, an optical disk, or a magnetic tape. In addition, if the electronic apparatus is a silver salt film camera, the image plane IP may correspond to a film surface.

In the zoom lens 100 according to the present embodiment, intervals between the first, second, third, and fourth lens groups G1, G2, G3, and G4 may be changed during zooming from a wide angle position to a telephoto position. That is, each of the lens groups G1 through G4 may move along an optical axis so that an air interval between the first lens group G1 and the second lens group G2, an air interval between the second lens group G2 and the third lens group G3, and an air interval between the third lens group G3 and the fourth lens group G4 may be changed.

During the zooming from the wide angle position to the telephoto position, the first lens group G1 may move to form a convex trace toward the image plane side (i.e., toward and then away from the image plane side) as illustrated by an arrow a of FIG. 1. Also, the second lens group G2 and the third lens group G3 may move from the image plane side toward the object side as illustrated by arrows b, c1, and c2 of FIG. 1. In addition, the fourth lens group G4 may move from the image plane side to the object side as illustrated by an arrow d of FIG. 1.

In the zoom lens 100 according to the present embodiment, during focusing from an infinite distance object to a near object, the third lens group G3 may move from the object side to the image plane side. The arrow c1 indicated with a solid line and the arrow c2 indicated with a dotted line in FIG. 1 respectively refer to a movement trace to correct an image plane shift due to zooming from a wide angle position to a telephoto position during focusing to an infinite distance object and to a near object.

In the zoom lens 100 according to the present embodiment, the lens L6 is movable in a surface that crosses (for example, crosses at right angles) an optical axis, as illustrated by an arrow e of FIG. 1. Thus, image-shaking due to a vibration such as hand-shaking may be optically corrected by shifting an image formed on the image plane IP in a direction perpendicular to the optical axis by moving the lens L6 (e.g., a correction lens).

As described above, in the zoom lens 100 of four groups respectively having negative, positive, negative, and positive refractive powers, the axial bundle of light rays gets expanded at the object side of the second lens group G2, and thus, spherical aberration may be easily generated in the lens L4 that is disposed most adjacent to the object side. Thus, an imaging-shaking correction device which moves the lens L6 of the second lens group G2, which is located most adjacent to the image plane side, in a direction approximately perpendicular to the optical axis, may be disposed to reduce effects of change of aberration. In this case, aberration may be sufficiently removed by two lenses L4 and L5 disposed at the object side of the second lens group G2 and image-shaking correction may be performed by the lens L6 without having various aberration effects.

The zoom lens 100 according to the present embodiment may satisfy the following conditions.

$$0.05 < M_4/M_2 < 1.0 \quad \text{(Condition 1)}$$

$$0.8 < f_4/f_t < 5.0 \quad \text{(Condition 2)}$$

Here, $M_2$ denotes an amount of movement of the second lens group G2 along an optical axis during zooming from a wide angle position to a telephoto position, $M_4$ denotes an amount of movement of the fourth lens group G4 toward the optical axis during the zooming from the wide angle position to the telephoto position, $f_4$ denotes a synthesis focal length of the fourth lens group G4, and $f_t$ denotes an overall focal length in the telephoto position.

When $M_4/M_2$ exceeds an upper limit of the condition 1, the amount of movement $M_4$ of the fourth lens group G4 becomes larger than the amount of movement $M_2$ of the second lens group G2 and the amount of movement of the third lens group G3 disposed between the second lens group G2 and the fourth lens group G4 may be restricted. When focusing by moving the third lens group G3 in the direction toward the optical axis, the air interval between the third lens group G3 and the fourth lens group G4 needs to be sufficiently enlarged in the wide angle position to secure the amount of movement of the third lens group G3 during focusing to a near object from the telephoto position. In this case, the miniaturization of the zoom lens 100 may be difficult.

In the case in which $M_4/M_2$ is less than or equal to a lower limit of the condition 1, the amount of movement $M_4$ of the fourth lens group G4 becomes smaller than the amount of movement $M_2$ of the second lens group G2, and when a device for retracting a lens barrel is formed with a cam, there may be a large difference between a cam stroke of the second lens group G2 and a cam stroke of the fourth lens group G4. In this case, it may be difficult to reduce a retracting thickness when storing lens by retracting the lens barrel. Also, if the amount of movement $M_4$ of the fourth lens group G4 from the telephoto position to the object side is small, an effective diameter of the fourth lens group G4 may become large due to an off-axial light flux. Thus, an increase in weight or cost due to enlargement of the fourth lens group G4 may occur.

In the zoom lens 100 according to the present embodiment, when $f_4/f_t$ exceeds an upper limit of the condition 2, the fourth lens group G4 may have less positive refractive power and it may be difficult to locate an exit pupil far away. In this case, a light ray has a high inclination degree when incident in the solid-state imaging device, and thus, deterioration in image quality, such as a decrease in an amount of incident light or an incident error in a color filter, may be caused.

When $f_4/f_t$ is lower than or equal to a lower limit of the condition 2, the fourth lens group G4 has a larger positive refractive power and it may be difficult to correct spherical aberration in the telephoto position. Also, it may be difficult to correct an aberration change during zooming from the wide angle position to the telephoto position.

The zoom lens 100 according to the present embodiment may satisfy the following conditions.

$$0.1 < M_4/M_2 < 0.8 \quad \text{(Condition 1a)}$$

$$0.9 < f_4/f_t < 2.4 \quad \text{(Condition 2a)}$$

The zoom lens 100 according to the present embodiment may satisfy the following conditions.

$$1.65 < nd_3 \quad \text{(Condition 3)}$$

$$0.005 < nd_3 - nd_4 \quad \text{(Condition 4)}$$

Here, $nd_3$ denotes a refractive index of the negative lens L7 included in the third lens group G3 at a d-line (a wavelength of 587.56 nanometers) and $n_4$ denotes a refractive index of the positive lens L8 included in the fourth lens group G4 at a d-line.

When $nd_3$ is less than or equal to a lower limit of the condition 3, it is more difficult to miniaturize the zoom lens 100. The negative refractive power of the third lens group G3 needs to be strengthened (e.g., made more negative) to enhance an effect by a telephoto arrangement in the telephoto position. However, if a refractive power of a lens material is low, a curvature of a lens surface becomes higher. As a result, coma aberration due to decentration or deterioration in astigmatic field curves may be greater. Also, when the curvature of the lens surface becomes higher, a thickness in a direction toward an off-axial optical axis becomes greater so that it may be difficult for the zoom lens 100 to be miniaturized or made to be light-weight.

When $nd_3 - nd_4$ is lower than or equal to a lower limit of the condition (4), a refractive index $nd_4$ of the positive lens L8 included in the fourth lens group G4 may become higher. Since the fourth lens group G4 is most adjacent to the image plane, the fourth lens group G4 may enable an off-axial light flux to be incident in the imaging surface of the solid-state imaging device compared to the third lens group G3. Then, a lens diameter of the positive lens L8 included in the fourth lens group G4 may become greater. Also, a material having a high refractive index has a high melting point and is generally hard, and thus, it may be relatively difficult to manufacture the positive lens L8 having a large lens diameter. Also, when the positive refractive power of the fourth lens group G4 is strengthened (e.g., made more positive), the curvature of the lens surface decreases and thus, a ghost image prevention effect may be reduced.

The zoom lens 100 according to the present embodiment may satisfy the following conditions.

$$1.70 < nd_3 \quad \text{(Condition 3a)}$$

$$0.01 < nd_3 - nd_4 < 0.2 \quad \text{(Condition 4a)}$$

The zoom lens 100 according to the present embodiment may satisfy the following condition.

$$0.55 < M_3/M_2 < 1.0 \quad \text{(Condition 5)}$$

Here, $M_2$ denotes an amount of movement of the second lens group G2 in a direction toward an optical axis during zooming from a wide angle position to a telephoto position and $M_3$ denotes an amount of movement of the third lens group G3 in the direction toward an optical axis during the zooming from the wide angle position to the telephoto position.

When $M_3/M_2$ exceeds an upper limit of the condition 5, the amount of movement $M_3$ of the third lens group G3 becomes larger than the amount of movement $M_2$ of the second lens group G2 and the third lens group G3 having a negative refractive power may weaken (e.g., reduce the effect of) a zooming operation of a main zooming lens group, which is the second lens group G2 having a positive refractive power. In this case, it may be difficult to obtain a high zooming ratio.

When $M_3/M_2$ is lower than or equal to a lower limit of the condition 5, the amount of movement $M_3$ of the third lens group G3 is smaller than the amount of movement $M_2$ of the second lens group G2 so that an air interval between the second lens group G2 and the third lens group G3 in the telephoto position may be overly widened. In this case, as a refractive power of a telephoto type including the second lens group G2 and the third lens group G3 becomes too large, it may be difficult to obtain a necessary back focus. Also, when a device for retracting a lens barrel is formed with a cam, there may be a large difference between a cam stroke of the second lens group G2 and a cam stroke of the third lens group G3. In this case, when storing a lens by retracting the lens barrel, it may be difficult to miniaturize a retracting thickness.

The zoom lens 100 according to the present embodiment may satisfy the following condition.

$$0.1 < |f_3/f_t| < 0.8 \quad \text{(Condition 6)}$$

Here, $f_3$ denotes a focal length of the third lens group G3 and $f_t$ denotes an overall focal length at a telephoto position.

When $|f_3/f_t|$ exceeds an upper limit of the condition 6, the third lens group G3 has a weakened negative refractive power (e.g., made less negative) so that a refractive power of a telephoto type lens including the second lens group G2 and the third lens group G3 is weakened (e.g., reduced) and it may be difficult to reduce an overall length of the zoom lens 100. Also, during focusing by the third lens group G3, the amount of movement of the third lens group G3 increases, and consequently, the overall length of the zoom lens 100 increases, and thus, miniaturization of the zoom lens 100 may be difficult.

When $|f_3/f_t|$ is lower than or equal to a lower limit of the condition 6, the third lens group G3 has a stronger negative refractive power (e.g., more negative), and thus, coma aberration or astigmatic field curves due to decentration may increase.

The zoom lens 100 according to the present embodiment may satisfy the following conditions.

$$0.6 < M_3/M_2 < 1.0 \quad \text{(Condition 5a)}$$

$$0.25 < |f_3/f_t| < 0.6 \quad \text{(Condition 6a)}$$

The zoom lens 100 according to the present embodiment may satisfy the following condition.

$$0.1 < f_2/f_t < 0.8 \quad \text{(Condition 7)}$$

Here, $f_2$ denotes a focal length of the second lens group G2 and $f_t$ denotes an overall focal length at a telephoto position.

When $f_2/f_t$ exceeds an upper limit of the condition 7, the positive refractive power of the second lens group G2 weakens (e.g., is reduced), and thus, a refractive power of a telephoto type lens including the second lens group G2 and the third lens group G3 is weakened (e.g., reduced) so that it may be difficult to reduce an overall length of a zoom lens.

When $f_2/f_t$ is lower than or equal to a lower limit of the condition 7, the positive refractive power of the second lens group G2 becomes stronger (e.g., made more positive) so that it may be difficult to correct spherical aberration at the telephoto position.

The zoom lens 100 according to the present embodiment may satisfy the following condition.

$$0.25 < f_2/f_t < 0.5 \quad \text{(Condition 7a)}$$

The zoom lens 100 according to the present embodiment may satisfy the following condition.

$$2.0 < f_5/f_2 < 20.0 \quad \text{(Condition 8)}$$

Here, $f_5$ denotes a focal length of the lens L5 and $f_t$ denotes an overall focal length at a telephoto position.

When $f_5/f_2$ exceeds an upper limit of the condition 8, the positive refractive power of the lens L5 is weakened (e.g., made less positive) so that it may be necessary to strengthen the positive refractive power (e.g., make more positive) of the lens L4 in order to obtain a necessary positive refractive power in the second lens group G2. In this case, coma aberration and astigmatic field curves by decentration of the lens L4 may be increased.

When $f_5/f_2$ is lower than or equal to the condition 8, the positive refractive power of the lens L5 is stronger and thus it may be difficult to correct spherical aberration in the lens L5.

The zoom lens 100 according to the present embodiment may satisfy the following condition.

$$3.5 < f_5/f_2 < 15.0 \quad \text{(Condition 8a)}$$

The zoom lens 100 according to the present embodiment may satisfy the following condition.

$$0.2 < |f_1/f_t| 0.8 \quad \text{(Condition 9)}$$

Here, $f_1$ denotes a focal length of the first lens group G1 and $f_t$ denotes an overall focal length at a telephoto position.

When $|f_1/f_t|$ exceeds an upper limit of the condition 9, the negative refractive power of the first lens group G1 is weakened (e.g., made less negative) so that a lens diameter and a thickness of each of the lenses L1 through L3 included in the first lens group G1 may increase. Thus, the zoom lens 100 may be enlarged.

When $|f_1/f_t|$ is lower than or equal to a lower limit of the condition 9, the negative refractive power of the first lens group G1 is stronger (e.g., more negative) so that it may be difficult to correct coma aberration or astigmatic field curves in the wide angle position.

The zoom lens 100 according to the present embodiment may satisfy the following condition.

$$0.4 < |f_1/f_t| < 0.55 \quad \text{(Condition 9a)}$$

In the zoom lens 100 according to the present embodiment, appropriate optical performance may be maintained during zooming, focusing, and image-shaking correction. Also, miniaturization of the zoom lens 100 may be achieved. According to the present embodiment, the zoom lens 100 may have a sufficient zooming rate (for example, a three-times higher zooming rate) and may appropriately correct aberration generated during an image plane shift and image-shaking correction due to zooming, thereby obtaining a high optical performance. Also, an overall optical length may be reduced, so that the zoom lens 100 included in an electronic apparatus are miniaturized and made to be light-weight.

It should be understood that the various embodiments described herein should be considered in a descriptive sense only and not for purposes of limitation. Descriptions of features or elements within each embodiment should typically be considered as available for other similar features or elements in other embodiments.

For example, in the zoom lens 100 according to the present embodiment, a refractive lens group or a converter lens group may be disposed at the object side of the first lens group G1 as needed.

Hereinafter, various features and effects will be described according to various embodiments. In this regard, the presented embodiments may have different forms and should not be construed as being limited to the descriptions set forth herein.

Figure 2:
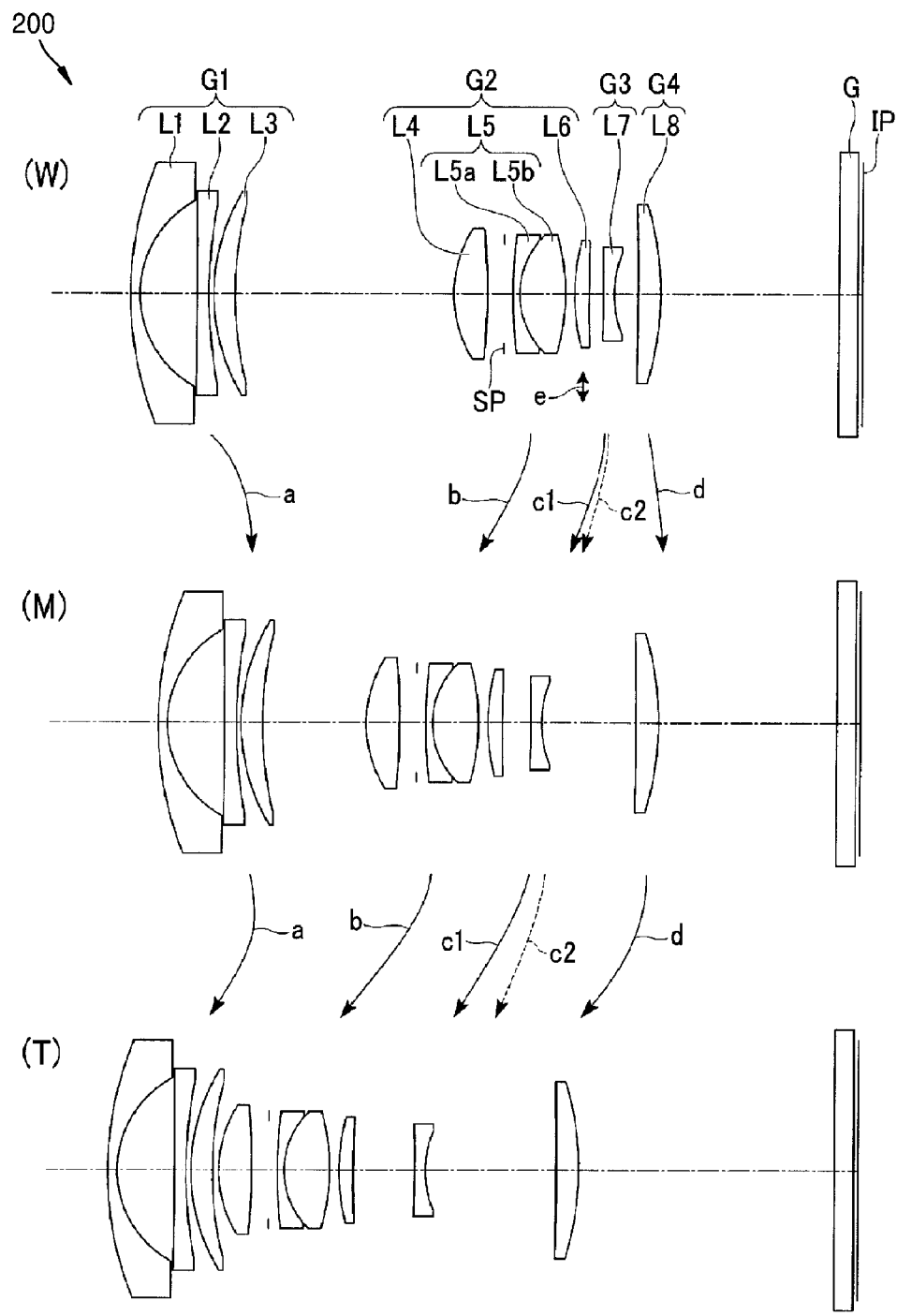
FIG. 2 illustrates arrangements of the zoom lens of FIG. 1 in a wide angle position (W), a middle position (M), and a telephoto position (T)

FIG. 2 illustrates arrangements (W), (M), and (T) of a zoom lens 200 based on design data of the first embodiment. In FIG. 2, (W) refers to a lens arrangement of the zoom lens 200 in a wide angle position, (M) refers to a lens arrangement of the zoom lens 200 in a middle position, and (T) refers to a lens arrangement of the zoom lens 200 in a telephoto position.

The zoom lens 200 of the first embodiment illustrated in FIG. 2 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 2, and the same arrow denotes the movement trace of the zoom lenses 100 and 200 of FIGS. 1 and 2, respectively.

Tables 1a through 1f show the design data of the zoom lens 200 of the first embodiment.

TABLE 1a

| Lens surface | r | d | nd | Nd |
|---|---|---|---|---|
| Object surface | ∞ | ∞ | | |
| S1 | 38.318 | 1.000 | 1.80401 | 46.57 |
| SS | 11.654 | 6.334 | | |
| S3* | −450.000 | 1.180 | 1.69012 | 52.90 |
| S4* | 41.500 | 0.436 | | |
| S5 | 22.324 | 2.200 | 1.84667 | 23.79 |
| S6 | 42.383 | Variable 1 | | |
| S7* | 13.024 | 3.430 | 1.58916 | 60.60 |
| S8* | −76.710 | 2.059 | | |
| S9 (ST) | ∞ | 0.800 | | |
| S10 | 70.884 | 0.600 | 1.72000 | 43.68 |
| S11 | 8.278 | 5.030 | 1.49700 | 81.59 |
| S12 | −20.420 | 0.800 | | |
| S13 | 27.416 | 1.530 | 1.48749 | 70.42 |
| S14 | 356.363 | Variable 2 | | |
| S15* | −430.985 | 1.200 | 1.73960 | 49.10 |
| S16* | 12.868 | Variable 3 | | |
| S17 | −300.000 | 2.270 | 1.69012 | 52.90 |
| S18* | −37.494 | Variable 4 | | |
| S19 | ∞ | 2.000 | 1.51680 | 64.21 |
| S20 | ∞ | 0.558 | | |
| Image plane | | | | |

The lens surface No. Si (where i refers to a natural number) in Table 1a refers to a lens surface number wherein the number sequentially increases, in an order toward an image plane side, while setting a lens surface of a lens, from the lenses included in the zoom lens 200, which is most adjacent to an object side, as the first lens.

An aperture stop (ST) and an optical block G (flat surface) are referred to.

"r" in Table 1a denotes a radius of curvature in millimeters (however, a surface which has ∞ as a value of r indicates that the surface is flat) of a lens surface corresponding to each lens surface number.

"d" in Table 1a denotes an axial interval in millimeters between an $i^{th}$ lens surface and an $i+1^{th}$ lens surface from the object side. In the case in which "d" has a variable value, each axial interval in millimeters in a wide angle position, a middle position, or a telephoto position is described.

"nd" in Table 1a denotes a refractive index of each lens.

"vd" in Table 1a denotes an Abbe number of each lens.

A zoom ratio of the zoom lens 200 according to the first embodiment is 2.94.

TABLE 1b

| Item | Wide angle position | Middle position | Telephoto position |
|---|---|---|---|
| Focal length | 16.500 | 26.500 | 48.500 |
| F number | 3.60 | 4.39 | 5.82 |
| Half angle of view (°) | 43.16 | 28.72 | 16.28 |
| Image height | 14.250 | 14.250 | 14.250 |
| Overall lens length | 77.695 | 74.718 | 79.469 |
| BF (in air) | 20.960 | 20.511 | 28.955 |

TABLE 1c

| Variable distance | Wide angle position | Middle position | Telephoto position |
|---|---|---|---|
| d6 | 23.194 | 11.172 | 0.535 |
| d14 | 1.479 | 3.331 | 6.619 |
| d16 | 2.511 | 10.153 | 13.809 |
| d18 | 19.084 | 18.634 | 27.079 |

Table 1 b indicates a zoom ratio along with a focal length in millimeters, an f-number (Fno), a half angle of view (ω) in degrees)(°, an image height in millimeters, an overall focal length in millimeters, and a back focus (BF) in millimeters in a wide angle position, a middle position, and a telephoto position. The overall lens length is a distance between an object side surface of a lens which is most adjacent to an object side and an image side surface of a lens which is most adjacent to an image side, plus a back focus (BF). The back focus (BF) is an air-converted value of a distance between an object side surface of a lens which is most adjacent to an image side and a paraxial image plane.

TABLE 1d

| Lens surface | K | A4 | A6 | A8 | A10 |
|---|---|---|---|---|---|
| S3 | 0 | −3.67276E−05 | 6.65114E−07 | −2.35887E−09 | −7.39257E−12 |
| S4 | 0 | −5.12110E−05 | 5.74183E−07 | −2.27932E−09 | −1.70299E−11 |
| S7 | 0 | −3.18670E−05 | −3.64857E−07 | 1.60289E−08 | −3.42090E−10 |
| S8 | 0 | 4.97693E−05 | −1.62355E−07 | 8.98797E−09 | −3.00472E−10 |
| S15 | 0 | −8.70283E−05 | 4.82565E−06 | −1.89146E−07 | 3.42689E−09 |
| S16 | 0 | −9.00502E−05 | 3.22938E−06 | −9.13852E−08 | 1.09176E−09 |
| S18 | 0 | −8.32989E−06 | −4.87307E−08 | 2.17795E−10 | −1.29257E−12 |

Table 1d indicates a surface number of a lens having an aspherical surface and an aspherical surface coefficient. Also, displacement of the aspherical surface from a location of a height (H) from an optical axis to an optical axis may be indicated by the following aspherical Equation 1 based on a lens vertex. "r" denotes a radius of curvature, "K" denotes a conic coefficient, and "$A_4$, $A_6$, $A_8$, and $A_{10}$" denote aspherical coefficients. In addition, the expression (E±m) (m refers to a constant) in an aspherical surface coefficient refers to (×$10^{±m}$).

$$X = \frac{(1/R)H^2}{1+\sqrt{1-(1+K)(H/R)^2}} + \quad \text{Equation 1}$$

$$A_4 H^4 + A_6 H^6 + A_8 H^8 + A_{10} H^{10} \quad 5$$

TABLE 1e

| Condition | First embodiment |
|---|---|
| $M_4/M_2$ (1) | 0.33 |
| $f_4/f_t$ (2) | 1.27 |
| nd3 (3) | 1.740 |
| nd3 − nd4 (4) | 0.049 |
| $M_3/M_2$ (5) | 0.79 |
| $|f_3/f_t|$ (6) | 0.35 |
| $f_2/f_t$ (7) | 0.32 |
| $f_5/f_2$ (8) | 7.27 |
| $|f_1/f_t|$ (9) | 0.43 |

Table 1e indicates conditions (1) $M_4/M_2$, (2) $f_4/f_t$, (3) nd3, (4) $nd_3-nd_4$, (5) $M_3/M_2$, (6) $|f_3/f_t|$, (7) $f_2/f_t$, (8) $f_5/f_2$, and (9) $|f_1/f_t|$.

TABLE 1f

|  | Wide angle position | Telephoto position |
|---|---|---|
| First embodiment | 0.174 mm | 0.258 mm |

Table 1f indicates an amount of movement in millimeters of the third lens of the second lens group in a direction perpendicular to an optical axis during image-shaking correction in a wide angle position and an amount of movement in millimeters of the third lens of the second lens group in a direction perpendicular to an optical axis during image-shaking correction in a telephoto position.

Figure 3:
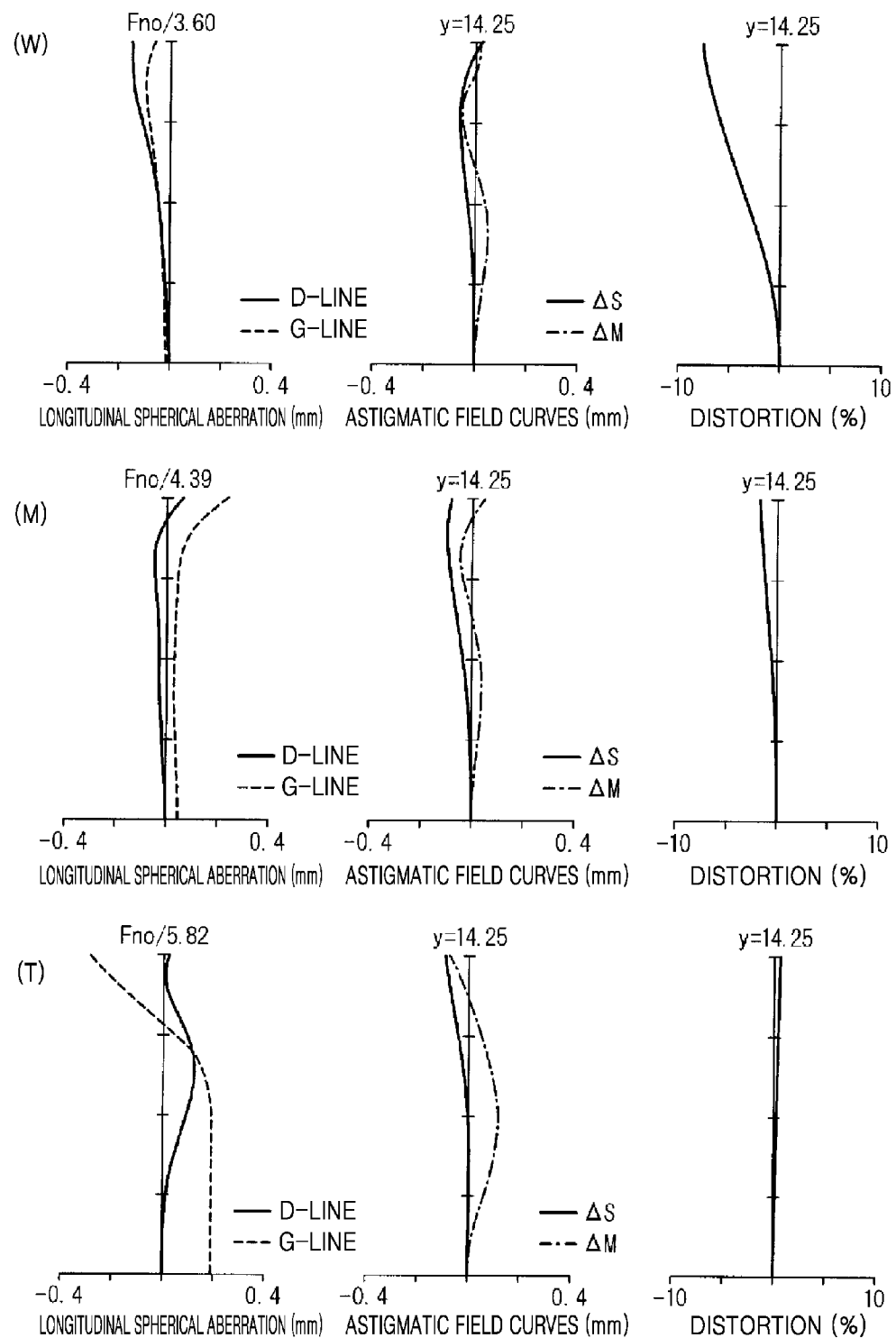
FIG. 3 illustrates spherical aberration, astigmatic field curves, and distortion of the zoom lens of FIG. 1 in a wide angle position (W), a middle position (M), and a telephoto position (T)

FIG. 3 illustrates longitudinal aberration (spherical aberration, astigmatic field curves, and distortion) in the zoom lens 200 of the first embodiment.

In FIG. 3, (W) refers to longitudinal aberration in a wide angle position, (M) refers to longitudinal aberration in a middle position, and (T) refers to longitudinal aberration in a telephoto position. The longitudinal aberrations refer to spherical aberration in millimeters, astigmatic field curves in millimeters, and distortion (expressed as a percentage), respectively.

In the spherical aberration, a vertical axis indicates an F-number (Fno), a solid line indicates spherical aberration at a d-line (a wavelength of 587.67 nanometers), and a dot-and-dash line indicates spherical aberration at a g-line (a wavelength of 435.835 nanometers).

In the astigmatic field curves, a vertical axis indicates an image height (y), a solid line indicates a sagittal light ray (ΔS) at each wavelength, and a dotted line indicates a meridional ray (ΔM).

In the distortion, a vertical axis indicates an image height (y) and a solid line indicates distortion at a d-line (a wavelength of 587.56 nanometers).

Also, FIGS. 4A and 4B illustrate lateral aberration of the zoom lens 200 according to the first embodiment at an infinite distance focusing location before decentration (in a general condition) and after decentration (during image-shaking correction). FIG. 4A illustrates lateral aberration of the zoom lens 200 according to the first embodiment in a wide angle position. FIG. 4B illustrates lateral aberration of the zoom lens 200 according to the first embodiment in a telephoto position.

In FIGS. 4A and 4B, (A) refers to lateral aberration before decentration at a location of an image height of 10 mm (reaching about 70% of the maximum image height), (B) refers to lateral aberration before decentration at a location of an image height of 0 mm (a central location of an optical axis), (C) refers to lateral aberration before decentration at a location of an image height of −10 mm (reaching about −70% of the maximum image height), (D) refers to lateral aberration after decentration at a location of an image height of 10 mm (reaching about 70% about the maximum image height), (E) refers to lateral aberration after decentration at a location of an image height of 0 mm (a central location of an optical axis), and (F) refers to lateral aberration after decentration at a location of an image height of −10 mm (reaching about −70% of the maximum image height). Also, a horizontal axis of the lateral aberration refers to a distance on an aperture stop from a main light ray, a solid line refers to a d-line, and a dotted line refers to a g-line.

The zoom lens 200 according to the first embodiment satisfies the conditions, as illustrated in Tables 1a through 1e. Also, in the zoom lens 200 according to the first embodiment, aberrations may be appropriately corrected as illustrated in FIGS. 3, 4A, and 4B.

In the wide angle position and the telephoto position at the location of the infinite distance focusing, a degree of decentration of an image when the zoom lens 200 is inclined by 0.3° is the same as a degree of decentration of an image when the lens L6 parallelly moves by the same degree in a direction perpendicular to the optical axis. Referring to each lateral aberration, the lateral aberration has a symmetry at the central location of the optical axis. Also, when comparing the lateral aberration at the location of the image height of 10 mm and the lateral aberration at the location of the image height of −10 mm before and after decentration, astigmatic field curves are small and degrees of inclination of aberration curves are substantially the same. Coma aberration by decentration and astigmatic filed curves by decentration are prevented so that a sufficient image formation performance may be obtained during image-shaking correction.

Figure 5:
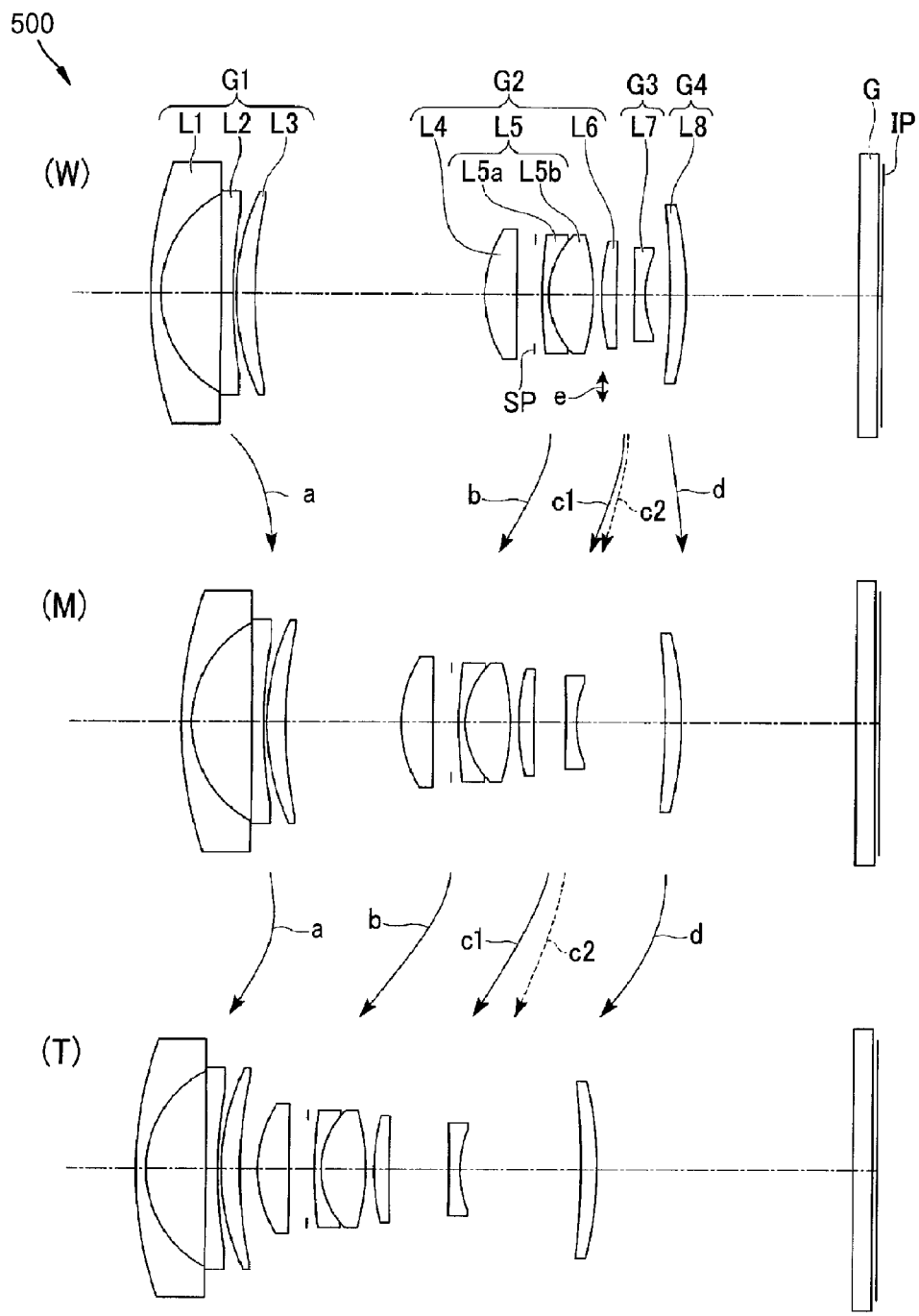
FIG. 5 illustrates arrangements of a zoom lens in a wide angle position (W), a middle position (M), and a telephoto position (T), according to another embodiment.

FIG. 5 shows arrangements (W), (M), and (T) of a zoom lens 500 based on design data of the second embodiment. The zoom lens 500 according to the second embodiment illustrated in FIG. 5 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 5, and the same arrow denotes the movement trace of the zoom lenses 100 and 500 of FIGS. 1 and 5, respectively.

Tables 2a through 2f illustrate design data of the zoom lens 500 illustrated in the second embodiment. Also, Tables 2a through 2f have the same reference indicators as in Tables 1a through 1f.

TABLE 2a

| Lens surface | r | D | nd | Nd |
|---|---|---|---|---|
| Object surface | ∞ | ∞ | | |
| S1 | 48.415 | 1.000 | 1.80401 | 46.57 |
| S2 | 12.242 | 6.578 | | |

TABLE 2a-continued

| Lens surface | r | D | nd | Nd |
|---|---|---|---|---|
| S3* | −450.000 | 1.180 | 1.69012 | 52.90 |
| S4* | 48.882 | 0.272 | | |
| S5 | 25.802 | 2.120 | 1.84667 | 23.79 |
| S6 | 54.936 | Variable 1 | | |
| S7* | 12.665 | 3.430 | 1.58916 | 60.60 |
| S8* | −143.156 | 2.042 | | |
| S9 (ST) | ∞ | 0.800 | | |
| S10 | 48.945 | 0.600 | 1.72000 | 43.68 |
| S11 | 8.172 | 4.820 | 1.49700 | 81.59 |
| S12 | −27.745 | 0.800 | | |
| S13 | 26.012 | 1.670 | 1.48749 | 70.42 |
| S14 | 126.119 | Variable 2 | | |
| S15* | −94.289 | 1.200 | 1.73310 | 48.90 |
| S16* | 18.443 | Variable 3 | | |
| S17 | −103.720 | 1.850 | 1.69350 | 53.19 |
| S18* | −45.536 | Variable 4 | | |
| S19 | ∞ | 2.000 | 1.51680 | 64.21 |
| S20 | ∞ | 0.558 | | |
| Image plane | | | | |

TABLE 2b

The zoom ratio is 2.94

| Item | Wide angle position | Middle position | Telephoto position |
|---|---|---|---|
| Focal length | 16.500 | 26.500 | 48.500 |
| f-number | 3.60 | 4.39 | 5.95 |
| Half angle of view (°) | 43.57 | 28.92 | 16.42 |
| Image height | 14.250 | 14.250 | 14.250 |
| Overall lens length | 78.519 | 74.532 | 79.450 |
| BF (in air) | 20.355 | 20.485 | 28.937 |

TABLE 2c

| Variable distance | Wide angle position | Middle position | Telephoto position |
|---|---|---|---|
| d6 | 24.623 | 12.307 | 1.945 |
| d14 | 1.929 | 3.523 | 6.542 |
| d16 | 2.570 | 9.174 | 12.983 |
| d18 | 18.478 | 18.608 | 27.060 |

TABLE 2d

| Lens surface | K | A4 | A6 | A8 | A10 |
|---|---|---|---|---|---|
| S3 | 0 | −2.82901E−05 | 5.59914E−07 | −2.49332E−09 | −1.69687E−12 |
| S4 | 0 | −4.15106E−05 | 4.63524E−07 | −2.35990E−09 | −8.10383E−12 |
| S7 | 0 | −2.85555E−05 | −4.14748E−07 | 1.45925E−08 | −2.67396E−10 |
| S8 | 0 | 3.82716E−05 | −1.75980E−07 | 8.03521E−09 | −2.19847E−10 |
| S15 | 0 | 3.94049E−04 | −1.40869E−05 | 3.15461E−07 | −3.54682E−09 |
| S16 | 0 | 4.79138E−04 | −1.42560E−05 | 3.19587E−07 | −3.80219E−09 |
| S18 | 0 | −1.86196E−05 | −3.61900E−08 | −1.37760E−10 | 5.71478E−13 |

TABLE 2e

| Condition | Second embodiment |
|---|---|
| M4/M2 (1) | 0.36 |
| $f_4/f_t$ (2) | 2.37 |
| nd3 (3) | 1.733 |
| nd3 − nd4 (4) | 0.040 |
| M3/M2 (5) | 0.80 |
| |f3/ft| (6) | 0.43 |
| f2/ft (7) | 0.34 |
| $f_5/f_2$ (8) | 10.22 |
| |f1/ft| (9) | 0.45 |

TABLE 2f

| | Wide angle position | Telephoto position |
|---|---|---|
| Second embodiment | 0.186 mm | 0.274 Mm |

Figure 6:
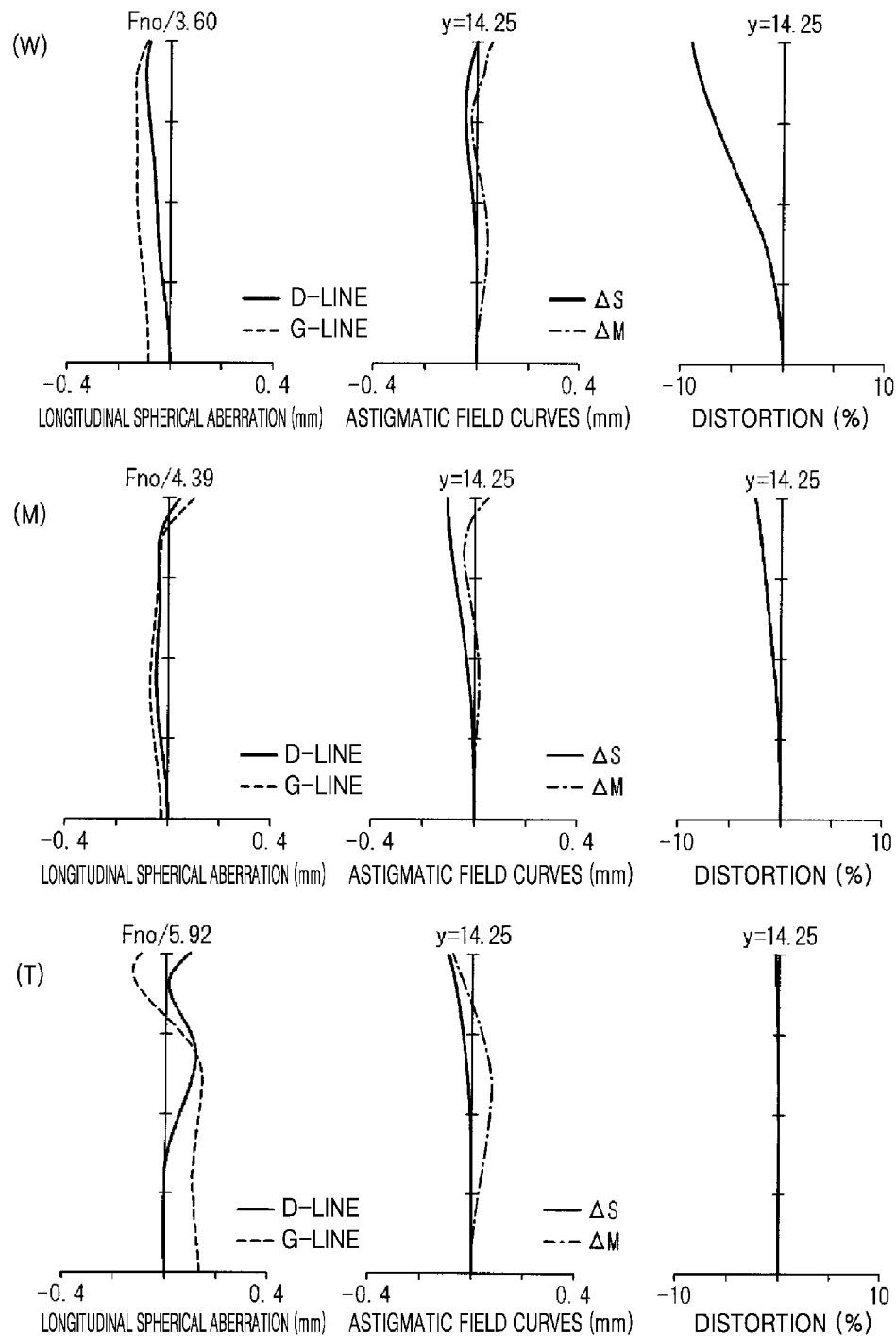
FIG. 6 illustrates spherical aberration, astigmatic field curves, and distortion of the zoom lens of FIG. 5 in a wide angle position (W), a middle position (M), and a telephoto position (T)
Figure 7A:
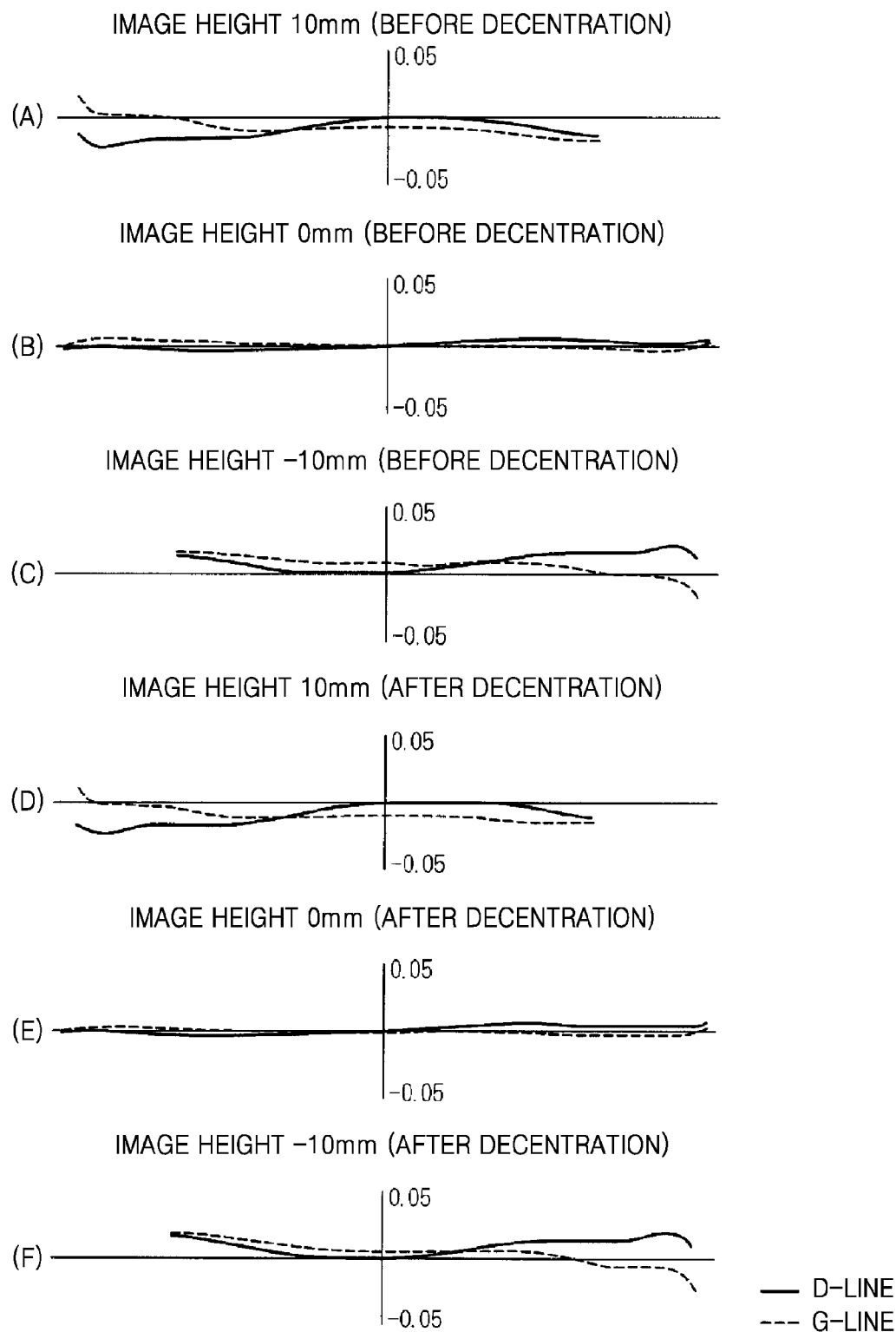
FIG. 7A illustrates lateral aberration of the zoom lens of FIG. 5 in a wide angle position (W)

FIG. 6 illustrates longitudinal aberration (spherical aberration, astigmatic field curves, and distortion) in the zoom lens 500 of the second embodiment. FIGS. 7A and 7B illustrate lateral aberration in a wide angle position and a telephoto position of the zoom lens 500 according to the second embodiment. Also, the same reference indicators are applied to both FIGS. 6, 7A, and 7B and FIGS. 3, 4A, and 4B.

The zoom lens 500 according to the second embodiment satisfies the conditions as illustrated in Tables 2a through 2e. In the zoom lens 500 according to the second embodiment, aberrations may be appropriately corrected as illustrated in FIGS. 6, 7A, and 7B.

Figure 8:
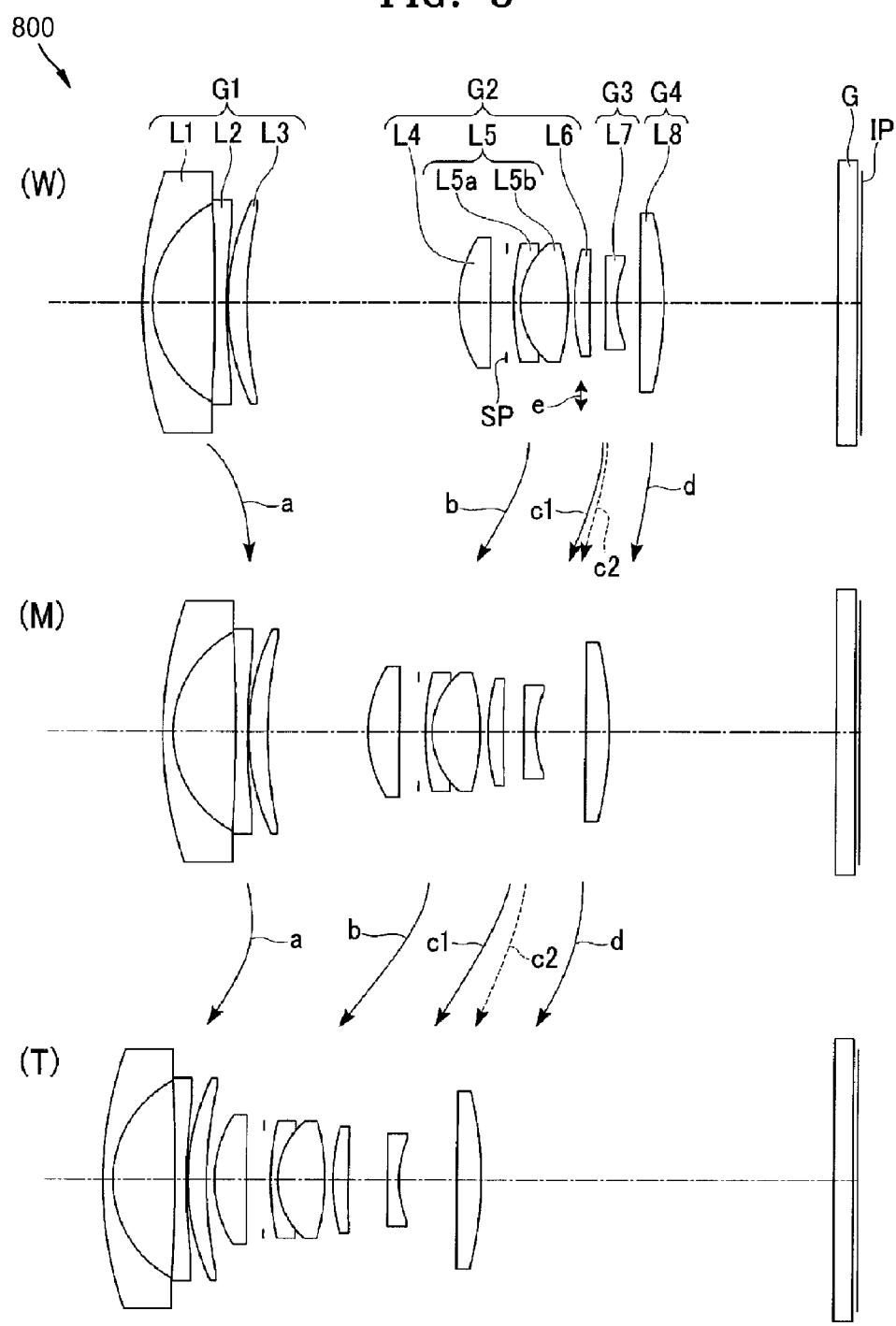
FIG. 8 illustrates arrangements of a zoom lens in a wide angle position (W), a middle position (M), and a telephoto position (T), according to another embodiment.

FIG. 8 illustrates arrangements (W), (M), and (T) of a zoom lens 800 based on design data of the third embodiment. The zoom lens 800 according to the third embodiment illustrated in FIG. 8 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 8, and the same arrow denotes the movement trace of the zoom lenses 100 and 800 of FIGS. 1 and 8, respectively.

Tables 3a through 3f illustrate design data of the zoom lens 800 illustrated in the third embodiment. Also, Tables 3a through 3f have the same reference indicators as in Tables 1a through 1f.

TABLE 3a

| Lens surface | r | d | nd | nd |
|---|---|---|---|---|
| Object surface | ∞ | ∞ | | |
| S1 | 37.865 | 1.000 | 1.80401 | 46.57 |
| S2 | 11.540 | 6.630 | | |
| S3* | −450.000 | 1.180 | 1.69012 | 52.90 |
| S4* | 42.701 | 0.150 | | |
| S5 | 24.086 | 2.190 | 1.84667 | 23.79 |
| S6 | 50.285 | variable 1 | | |
| S7* | 13.083 | 3.120 | 1.58916 | 60.60 |
| S8* | −1104.293 | 2.098 | | |
| S9 (ST) | ∞ | 0.687 | | |
| S10 | 32.604 | 0.600 | 1.72000 | 43.68 |
| S11 | 8.233 | 5.000 | 1.49700 | 81.59 |
| S12 | −21.553 | 0.800 | | |
| S13 | 23.561 | 1.670 | 1.48749 | 70.42 |
| S14 | 336.936 | variable 2 | | |
| S15* | −104.034 | 1.200 | 1.73960 | 49.10 |
| S16* | 12.658 | variable 3 | | |
| S17 | −300.000 | 2.470 | 1.69012 | 52.90 |
| S18* | −40.037 | variable 4 | | |
| S19 | ∞ | 2.000 | 1.51680 | 64.21 |
| S20 | ∞ | 0.560 | | |
| Image plane | | | | |

TABLE 3b

The zoom ratio is 2.94.

| Item | Wide angle position | Middle position | Telephoto position |
|---|---|---|---|
| Focal length | 16.500 | 26.500 | 48.500 |
| f-number | 3.61 | 4.44 | 5.93 |
| Half angle of view (°) | 43.60 | 29.05 | 16.29 |
| Image height | 14.250 | 14.250 | 14.250 |
| Overall lens length | 75.924 | 73.697 | 79.475 |
| BF (in air) | 20.140 | 25.744 | 38.855 |

TABLE 3c

| Variable distance | Wide angle position | Middle position | Telephoto position |
|---|---|---|---|
| d6 | 22.243 | 10.802 | 0.785 |
| d14 | 1.554 | 2.336 | 4.236 |
| d16 | 2.510 | 5.337 | 6.123 |
| d18 | 18.262 | 23.866 | 36.976 |

TABLE 3d

| Lens surface | K | A4 | A6 | A8 | A10 |
|---|---|---|---|---|---|
| S3 | 0 | −4.06604E−05 | 3.47037E−07 | 1.14197E−09 | −1.87812E−11 |
| S4 | 0 | −5.56997E−05 | 2.35682E−07 | 1.65702E−09 | −3.05575E−11 |
| S7 | 0 | −2.08137E−05 | −2.33455E−07 | 1.52501E−08 | −3.34317E−10 |
| S8 | 0 | 5.15485E−05 | 8.84215E−08 | 6.02431E−09 | −2.84334E−10 |
| S15 | 0 | 7.08640E−05 | −3.94261E−06 | 1.10041E−07 | −1.39522E−09 |
| S16 | 0 | 1.00574E−04 | −4.46332E−06 | 1.38481E−07 | −2.39470E−09 |
| S18 | 0 | −2.51040E−05 | −2.50874E−07 | 1.34859E−09 | −1.29642E−11 |

TABLE 3e

| Condition | Third embodiment |
|---|---|
| M4/M2 (1) | 0.75 |
| f4/ft (2) | 1.30 |
| nd3 (3) | 1.743 |
| nd3 − nd4 (4) | 0.014 |
| M3/M2 (5) | 0.89 |
| |f3/ft| (6) | 0.31 |
| f2/ft (7) | 0.30 |
| $f_s$/f2 (8) | 0.44 |
| |f1/ft| (9) | 3.69 |

TABLE 3f

| | Wide angle position | Middle position |
|---|---|---|
| Third embodiment | 0.148 mm | 0.217 Mm |

Figure 10A:
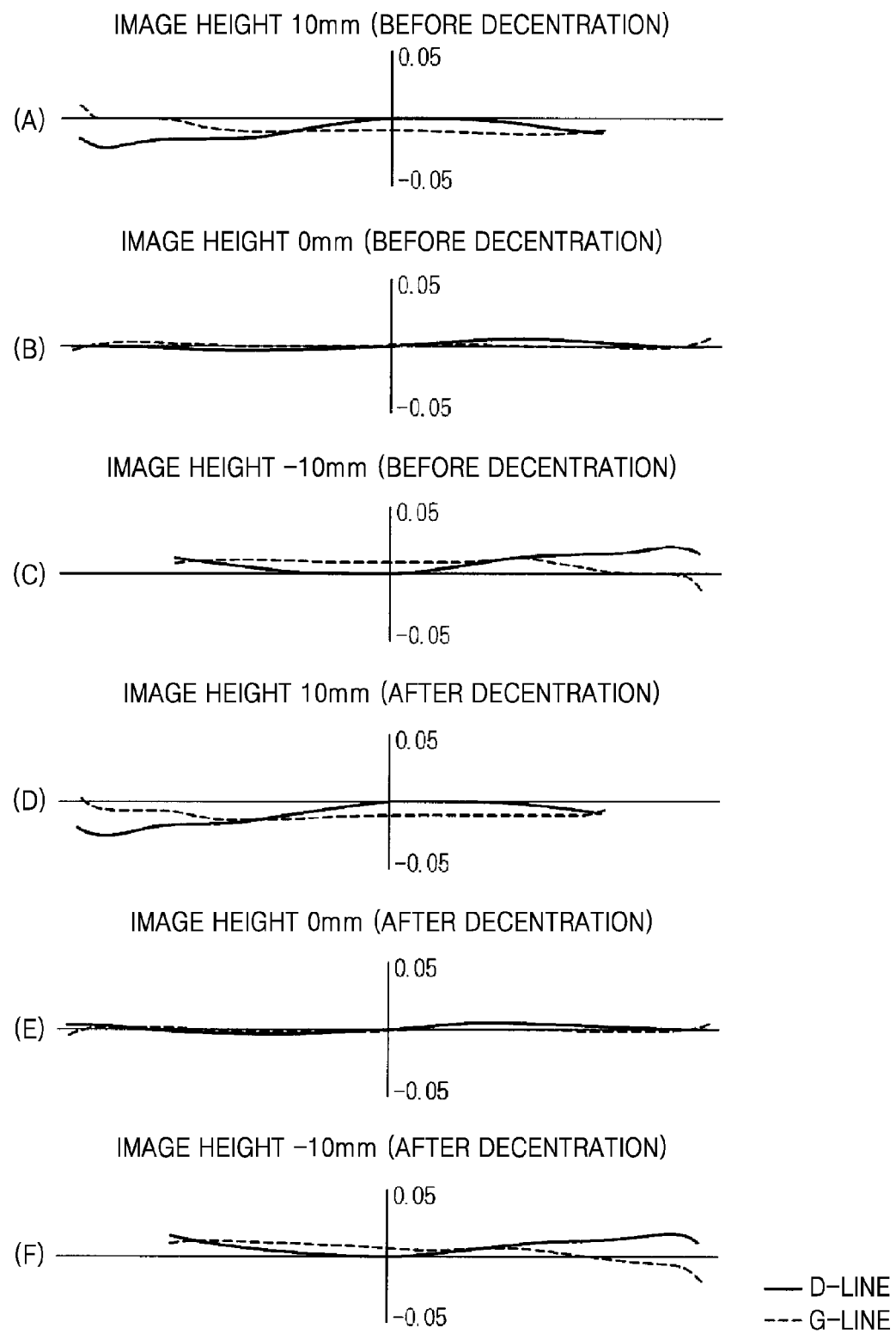
FIG. 10A illustrates lateral aberration of the zoom lens of FIG. 8 in a wide angle position (W)

FIG. 9 illustrates longitudinal aberration (spherical aberration, astigmatic field curves, and distortion) in the zoom lens 800 of the third embodiment. FIGS. 10A and 10B illustrate lateral aberration in a wide angle position and a telephoto position of the zoom lens 800 according to the third embodiment. Also, the same reference indicators are applied to both FIGS. 9, 10A, and 10B and FIGS. 3, 4A, and 4B.

The zoom lens 800 according to the third embodiment satisfies the conditions as illustrated in Tables 3a through 3e. In the zoom lens 800 according to the third embodiment, aberrations may be appropriately corrected as illustrated in FIGS. 9, 10A, and 10B.

Figure 11:
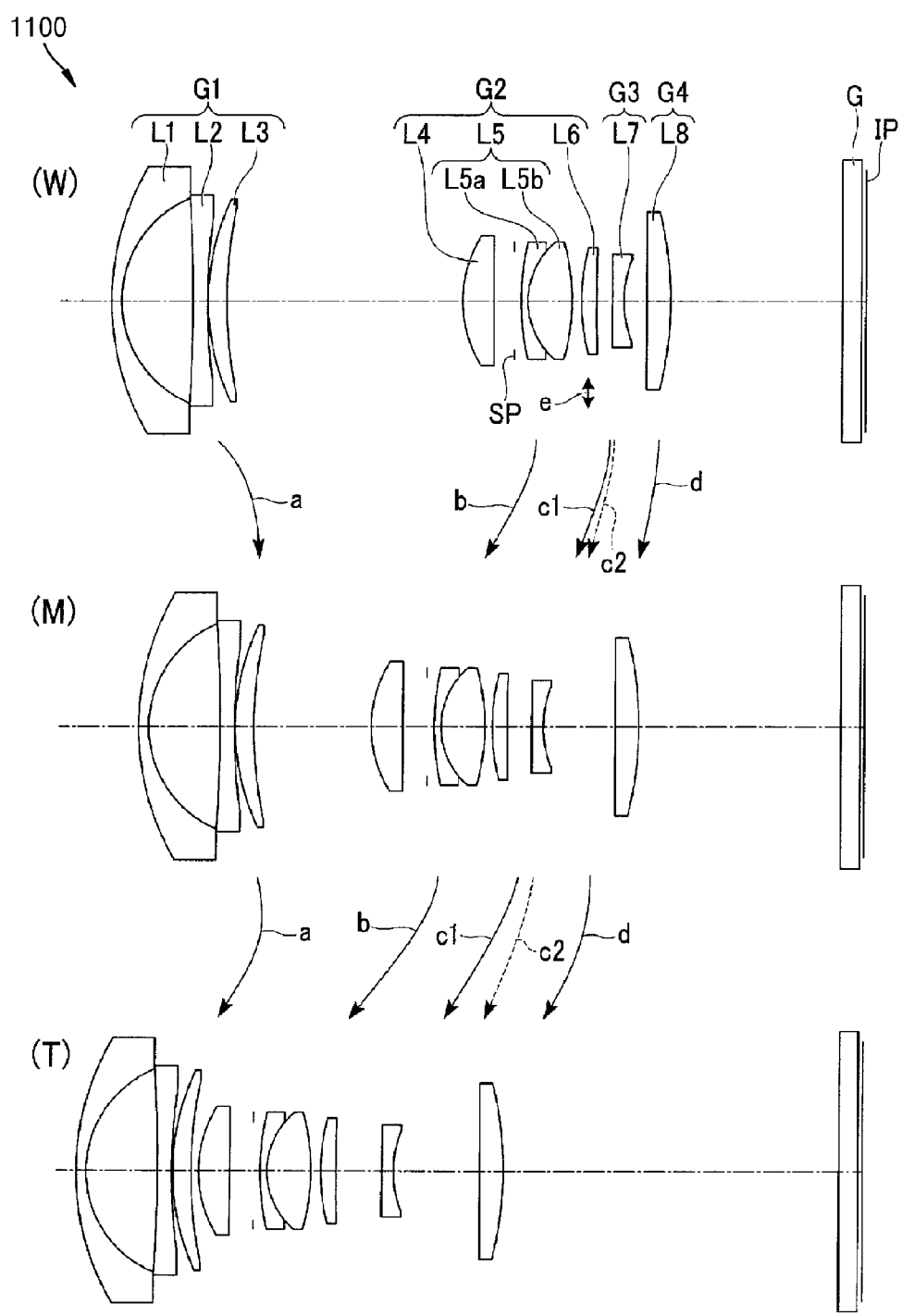
FIG. 11 illustrates arrangements of a zoom lens in a wide angle position (W), a middle position (M), and a telephoto position (T), according to another embodiment.

FIG. 11 illustrates arrangements (W), (M), and (T) of a zoom lens 1100 based on design data of the fourth embodiment. The zoom lens 1100 according to the fourth embodiment illustrated in FIG. 11 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 11, and the same arrow denotes the movement trace of the zoom lenses 100 and 1100 of FIGS. 1 and 11, respectively.

Tables 4a through 4f illustrate design data of the zoom lens 1100 illustrated in the fourth embodiment. Also, Tables 4a through 4f have the same reference indicators as in Tables 1a through 1f.

TABLE 4a

| Lens surface | R | d | nd | Nd |
|---|---|---|---|---|
| Object surface | ∞ | ∞ | | |
| S1 | 27.411 | 1.000 | 1.80401 | 46.57 |
| S2 | 11.797 | 7.867 | | |
| S3* | −105.107 | 1.180 | 1.69012 | 52.90 |
| S4* | 41.000 | 0.150 | | |
| S5 | 23.323 | 2.400 | 1.84667 | 23.79 |
| S6 | 44.775 | Variable 1 | | |
| S7* | 13.406 | 3.750 | 1.58916 | 60.60 |
| S8* | −223.908 | 2.223 | | |
| S9 (ST) | ∞ | 0.500 | | |
| S10 | 33.881 | 0.600 | 1.72000 | 43.68 |
| S11 | 8.218 | 4.960 | 1.49700 | 81.59 |
| S12 | −22.972 | 0.800 | | |
| S13 | 23.094 | 1.720 | 1.48749 | 70.42 |
| S14 | 592.375 | Variable 2 | | |
| S15* | −95.759 | 1.200 | 1.73960 | 49.10 |
| S16* | 11.904 | Variable 3 | | |
| S17 | −300.000 | 2.600 | 1.69012 | 52.90 |
| S18* | −31.230 | Variable 4 | | |
| S19 | ∞ | 2.000 | 1.51680 | 64.21 |
| S20 | ∞ | 0.562 | | |
| Image plane | | | | |

TABLE 4b

The zoom ratio is 3.09.

| Item | Wide angle position | Middle position | Telephoto position |
|---|---|---|---|
| Focal length | 16.500 | 26.500 | 50.908 |
| f-number | 3.56 | 4.34 | 5.91 |
| Half angle of view (°) | 43.54 | 28.93 | 15.56 |
| Image height | 14.250 | 14.250 | 14.250 |
| Overall lens length | 80.565 | 77.300 | 83.639 |
| BF (in air) | 20.225 | 23.307 | 37.169 |

TABLE 4c

| Variable distance | Wide angle position | Middle position | Telephoto position |
|---|---|---|---|
| d6 | 24.650 | 12.071 | 0.500 |
| d14 | 1.582 | 2.757 | 5.024 |
| d16 | 2.477 | 7.533 | 9.315 |
| d18 | 18.345 | 21.427 | 35.289 |

TABLE 4d

| Lens surface | K | A4 | A6 | A8 | A10 |
|---|---|---|---|---|---|
| S3 | 0 | −4.90009E−05 | 6.13265E−07 | −2.46813E−09 | 4.70225E−13 |
| S4 | 0 | −5.74934E−05 | 5.50280E−07 | −2.09617E−09 | −6.27768E−12 |
| S7 | 0 | −2.60879E−05 | −2.79921E−07 | 1.01557E−08 | −2.24765E−10 |
| S8 | 0 | 4.13189E−05 | −1.00132E−07 | 4.62767E−09 | −2.03906E−10 |
| S15 | 0 | −1.85675E−04 | 4.61442E−06 | 1.91925E−09 | −1.40505E−09 |
| S16 | 0 | −2.24746E−04 | 4.80786E−06 | −2.35602E−08 | −1.16385E−09 |
| S18 | 0 | −1.22944E−05 | −1.19953E−07 | 8.16017E−10 | −6.06278E−12 |

TABLE 4e

| Condition | Fourth embodiment |
|---|---|
| M4/M2 (1) | 0.62 |
| f4/ft (2) | 0.98 |
| nd3 (3) | 1.768 |
| nd3 − nd4 (4) | 0.075 |
| M3/M2 (5) | 0.87 |
| |f3/ft| (6) | 0.27 |
| f2/ft (7) | 0.29 |
| $f_s/f_2$ (8) | 0.43 |
| $|f_1/f_t|$ (9) | 4.17 |

TABLE 4f

| | Wide angle position | Telephoto position |
|---|---|---|
| Fourth embodiment | 0.141 mm | 0.214 Mm |

Figure 12:
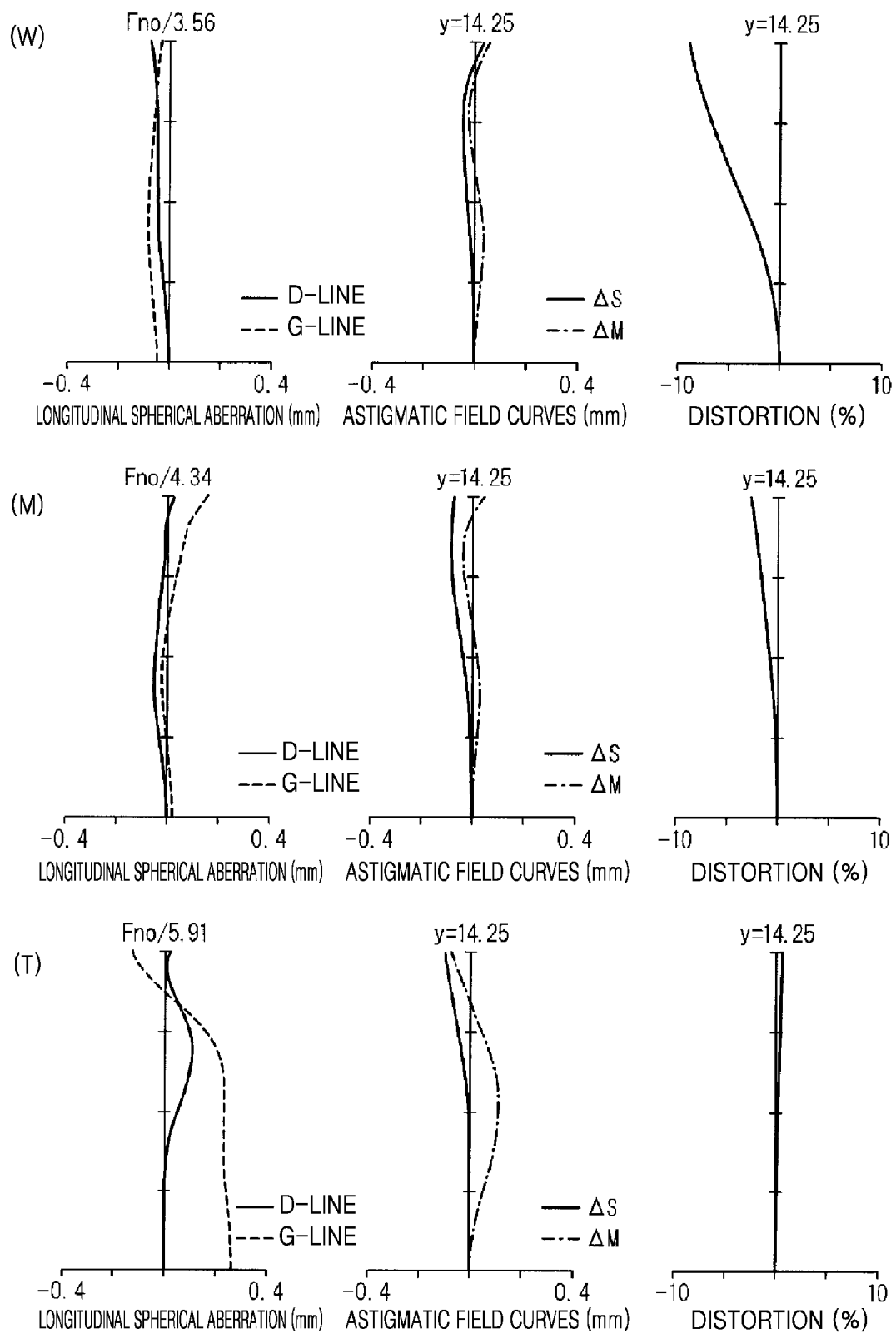
FIG. 12 illustrates spherical aberration, astigmatic field curves, and distortion of the zoom lens of FIG. 11 in a wide angle position (W), a middle position (M), and a telephoto position (T)
Figure 13A:
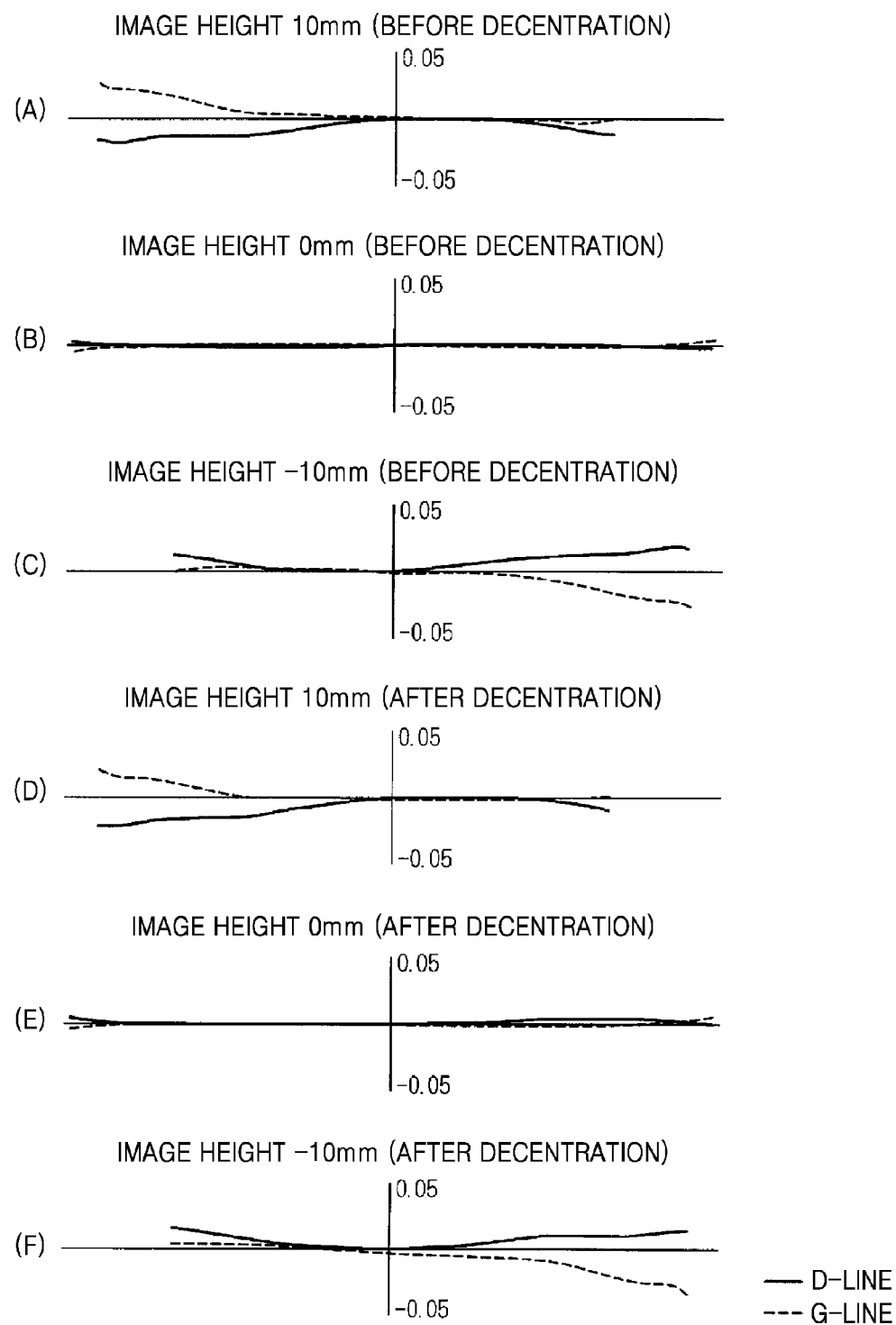
FIG. 13A illustrates lateral aberration of the zoom lens of FIG. 11 in a wide angle position (W)
Figure 13B:
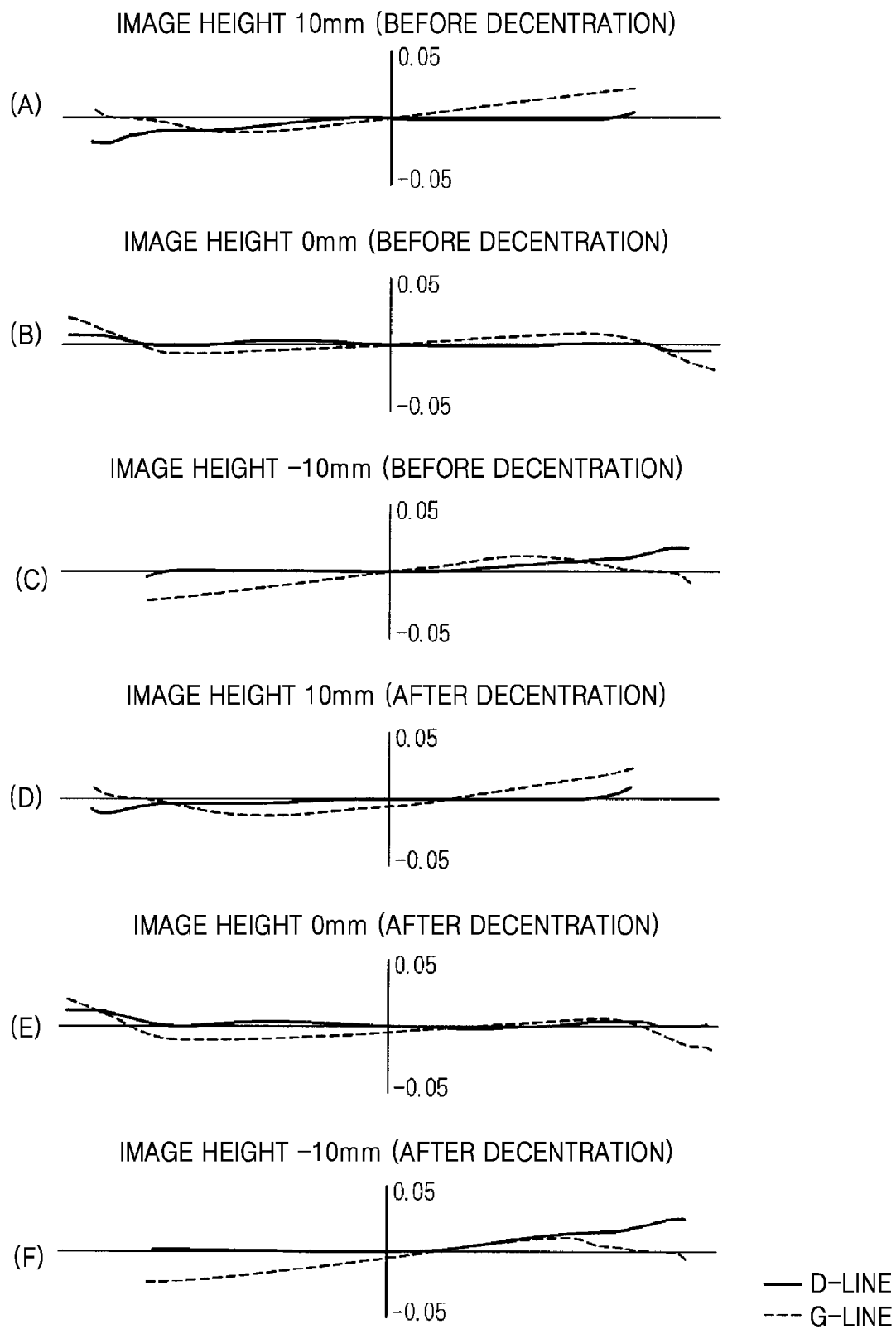
FIG. 13B illustrates lateral aberration of the zoom lens of FIG. 11 in a telephoto position (T)

FIG. 12 illustrates longitudinal aberration (spherical aberration, astigmatic field curves, and distortion) in the zoom lens 1100 of the fourth embodiment. FIGS. 13A and 13B illustrate lateral aberration in a wide angle position and a telephoto position of the zoom lens 1100 according to the fourth embodiment. Also, the same reference indicators are applied to both FIGS. 12, 13A, and 13B and FIGS. 3, 4A, and 4B.

The zoom lens 1100 according to the fourth embodiment satisfies the conditions as illustrated in Tables 4a through 4e. In the zoom lens 1100 according to the fourth embodiment, aberrations may be appropriately corrected as illustrated in FIGS. 12, 13A, and 13B.

Figure 14:
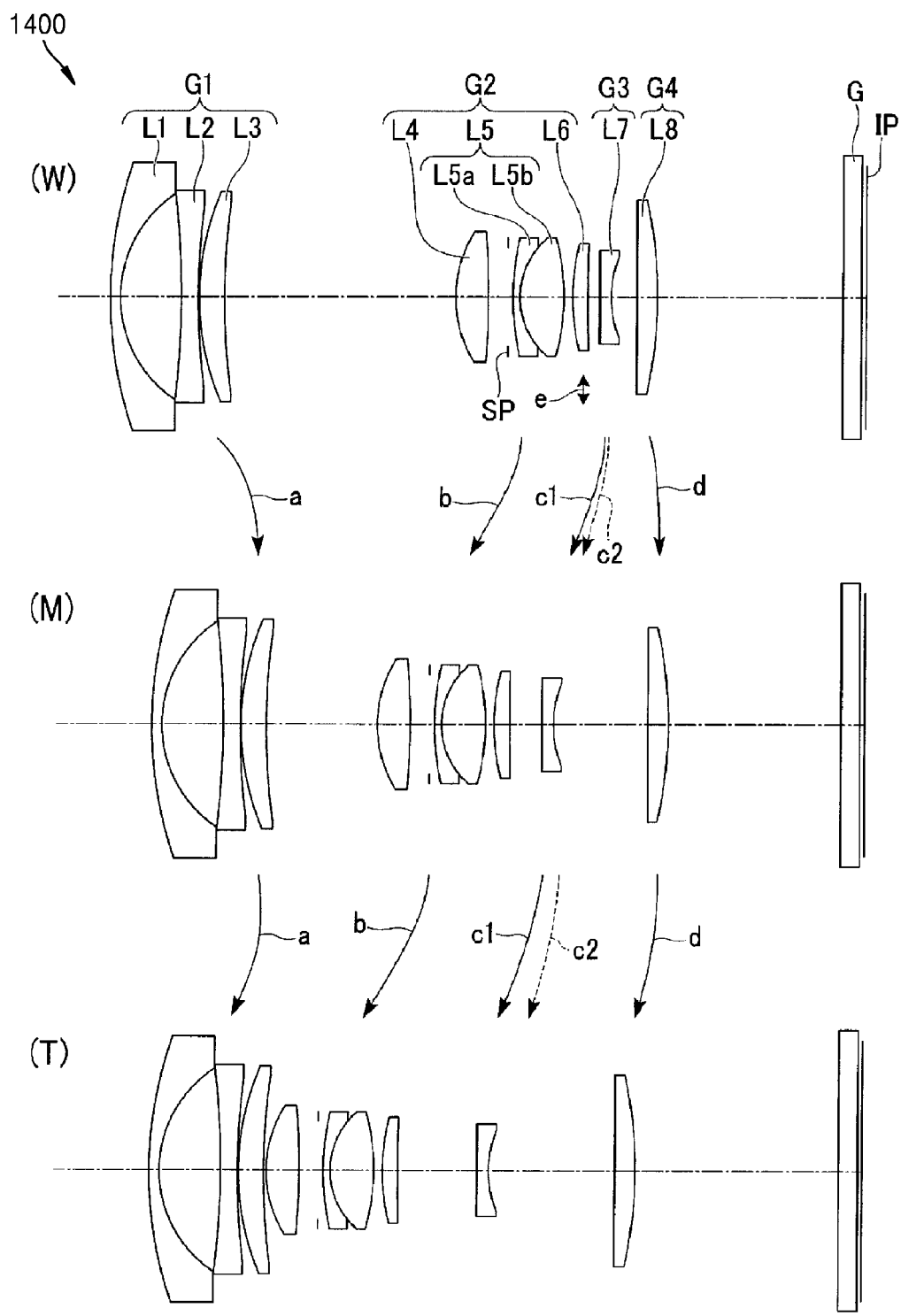
FIG. 14 illustrates arrangements of a zoom lens in a wide angle position (W), a middle position (M), and a telephoto position (T), according to another embodiment.

FIG. 14 illustrates arrangements (W), (M), and (T) of a zoom lens 1400 based on design data of the fifth embodiment. The zoom lens 1400 according to the fifth embodiment illustrated in FIG. 14 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 14, and the same arrow denotes the movement trace of the zoom lenses 100 and 1400 of FIGS. 1 and 14.

Tables 5a through 5f illustrate design data of the zoom lens 1400 illustrated in the fifth embodiment. Also, Tables 5a through 5f have the same reference indicators as in Tables 1a through 1f.

TABLE 5a

| Lens surface | r | d | nd | Nd |
|---|---|---|---|---|
| Object surface | ∞ | ∞ | | |
| S1 | 46.474 | 1.000 | 1.80401 | 46.57 |
| S2 | 12.939 | 6.413 | | |
| S3* | −150.305 | 1.790 | 1.69012 | 52.90 |
| S4* | 42.024 | 0.150 | | |
| S5 | 28.260 | 2.620 | 1.84667 | 23.79 |
| S6 | 69.843 | variable 1 | | |
| S7* | 12.815 | 3.480 | 1.58916 | 60.60 |
| S8* | −74.655 | 2.258 | | |
| S9 (ST) | ∞ | 0.557 | | |
| S10 | 62.917 | 0.600 | 1.72000 | 43.68 |
| S11 | 8.418 | 4.800 | 1.49700 | 81.59 |
| S12 | −25.834 | 0.800 | | |
| S13 | 27.373 | 1.560 | 1.48749 | 70.42 |
| S14 | 645.580 | variable 2 | | |
| S15* | −93.231 | 1.200 | 1.73960 | 49.10 |
| S16* | 16.161 | variable 3 | | |
| S17 | −300.000 | 2.150 | 1.69012 | 52.90 |
| S18* | −45.679 | variable 4 | | |
| S19 | ∞ | 2.000 | 1.51680 | 64.21 |
| S20 | ∞ | 0.558 | | |
| Image plane | | | | |

TABLE 5b

The zoom ratio is 2.94.

| Item | Wide angle position | Middle position | Telephoto position |
|---|---|---|---|
| Focal length | 16.500 | 26.500 | 48.497 |
| f-number | 3.69 | 4.45 | 5.84 |
| Half angle of view (°) | 43.56 | 29.08 | 16.40 |
| Image height | 14.250 | 14.250 | 14.250 |
| Overall lens length | 80.469 | 75.909 | 75.960 |
| BF (in air) | 21.515 | 20.069 | 23.456 |

TABLE 5c

| Variable distance | Wide angle position | Middle position | Telephoto position |
|---|---|---|---|
| d6 | 24.650 | 12.038 | 0.612 |
| d14 | 1.417 | 3.570 | 8.446 |
| d16 | 2.828 | 10.173 | 13.386 |
| d18 | 19.638 | 18.193 | 21.580 |

TABLE 5d

| Lens surface | K | A4 | A6 | A8 | A10 |
|---|---|---|---|---|---|
| S3 | 0 | −7.30722E−05 | 9.73050E−07 | −6.34114E−09 | 1.45807E−11 |
| S4 | 0 | −8.41822E−05 | 9.39744E−07 | −6.84650E−09 | 1.53866E−11 |
| S7 | 0 | −2.87607E−05 | −7.05899E−07 | 2.03822E−08 | −3.75777E−10 |
| S8 | 0 | 5.60522E−05 | −6.54899E−07 | 1.63515E−08 | −3.50975E−10 |
| S15 | 0 | 5.20956E−04 | −1.84192E−05 | 3.87613E−07 | −4.31254E−09 |
| S16 | 0 | 6.08674E−04 | −1.88537E−05 | 3.88193E−07 | −4.43276E−09 |
| S18 | 0 | −2.13779E−05 | −3.60867E−08 | 4.10882E−12 | −2.13947E−13 |

TABLE 5E

| condition | Fifth embodiment |
|---|---|
| M4/M2 (1) | 0.10 |
| f4/ft (2) | 1.59 |
| nd3 (3) | 1.768 |
| nd3 − nd4 (4) | 0.075 |
| M3/M2 (5) | 0.64 |
| |f3/ft| (6) | 0.37 |
| f2/ft (7) | 0.33 |
| f2b/f2 (8) | 0.42 |
| |f1/ft| (9) | 12.69 |

TABLE 5f

| | Wide angle position | Telephoto position |
|---|---|---|
| Fifth embodiment | 0.163 mm | 0.248 Mm |

Figure 15:
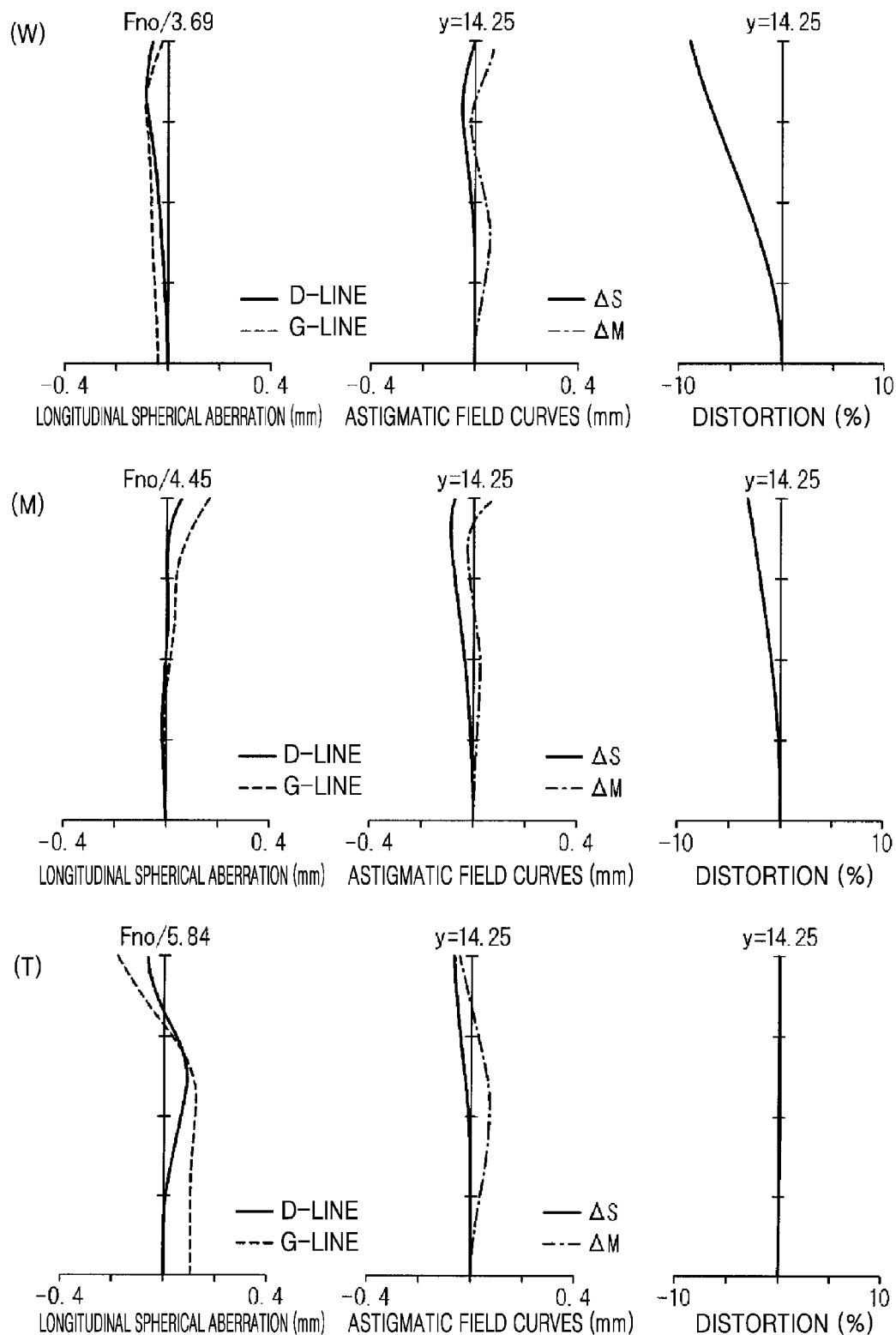
FIG. 15 illustrates spherical aberration, astigmatic field curves, and distortion of the zoom lens of FIG. 14 in a wide angle position (W), a middle position (M), and a telephoto position (T)
Figure 16B:
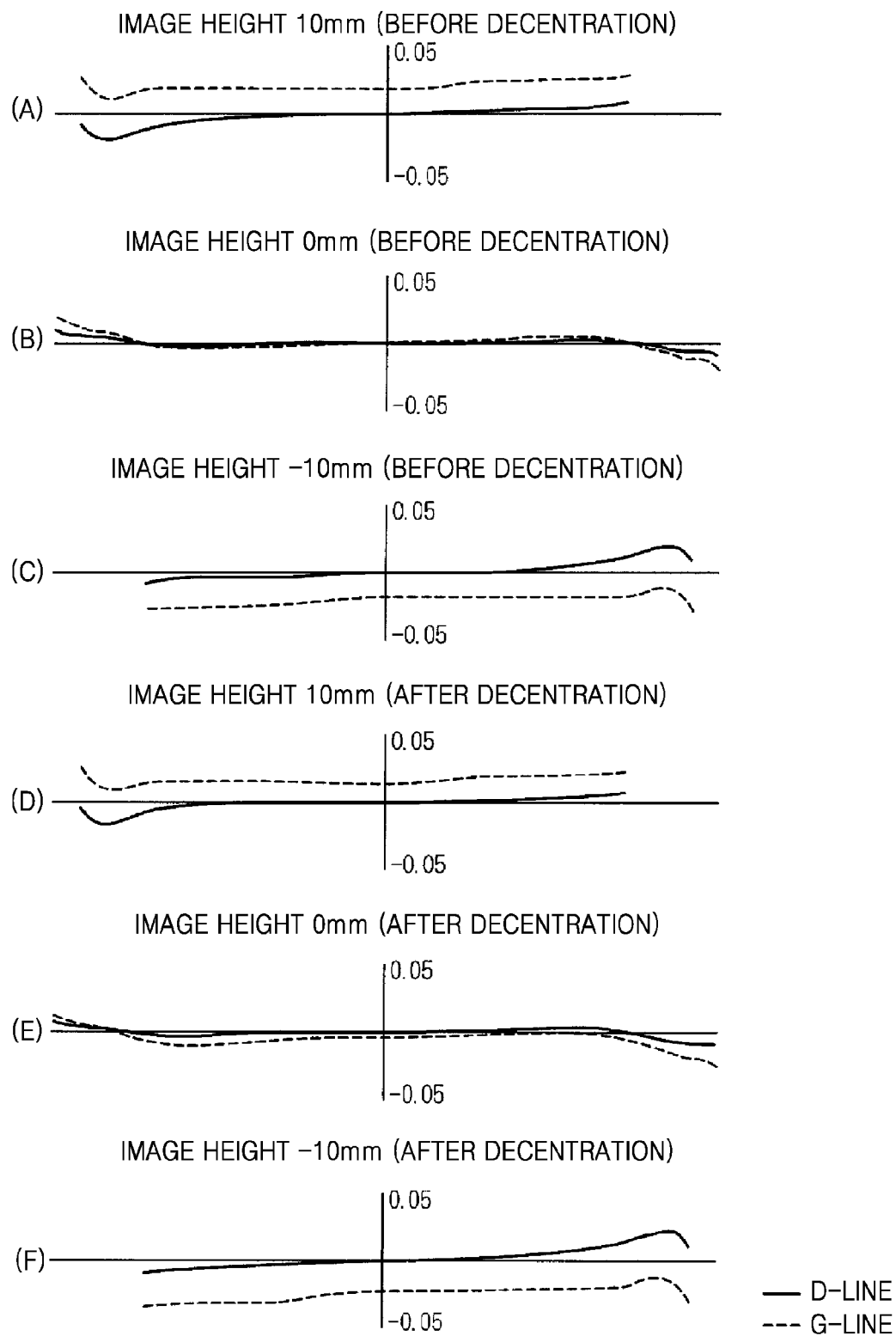
FIG. 16B illustrates lateral aberration of the zoom lens of FIG. 14 in a telephoto position (T)

FIG. 15 illustrates longitudinal aberration (spherical aberration, astigmatic field curves, and distortion) in the zoom lens 1400 of the fifth embodiment. FIGS. 16A and 16B illustrate lateral aberration in a wide angle position and a telephoto position of the zoom lens 1400 according to the fifth embodiment. Also, the same reference indicators are applied to both FIGS. 15, 16A, and 16B and FIGS. 3, 4A, and 4B.

The zoom lens 1400 according to the fifth embodiment satisfies the conditions as illustrated in Tables 5a through 5e. In the zoom lens 1400 according to the fifth embodiment, aberrations may be appropriately corrected as illustrated in FIGS. 15, 16A, and 16B.

Figure 17:
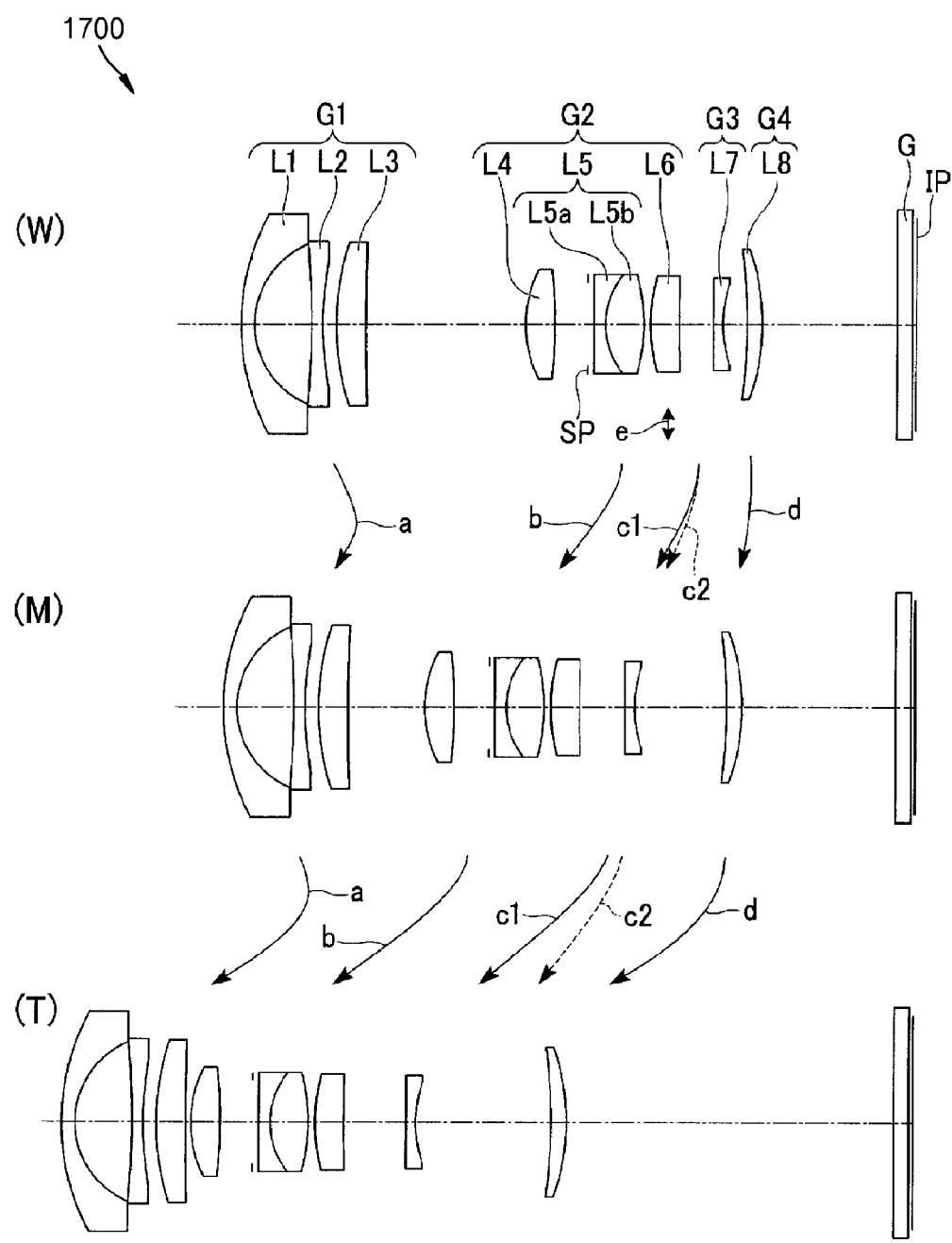
FIG. 17 illustrates arrangements of a zoom lens in a wide angle position (W), a middle position (M), and a telephoto position (T), according to another embodiment.

FIG. 17 illustrates arrangements (W), (M), and (T) of a zoom lens 1700 based on design data of the sixth embodiment. The zoom lens 1700 according to the sixth embodiment illustrated in FIG. 17 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 17, and the same arrow denotes the movement trace of the zoom lenses 100 and 1700 of FIGS. 1 and 17, respectively.

Tables 6a through 6e illustrate design data of the zoom lens 1700 illustrated in the sixth embodiment. Also, Tables 6a through 6f have the same reference indicators as in Tables 1a through 1f.

TABLE 6a

| Lens surface | r | d | nd | Nd |
|---|---|---|---|---|
| Object surface | ∞ | ∞ | | |
| S1 | 31.587 | 1.650 | 1.83481 | 42.71 |
| S2 | 11.323 | 7.748 | | |
| S3* | −72.114 | 1.180 | 1.69350 | 53.19 |
| S4* | 41.000 | 1.819 | | |
| S5 | 33.871 | 4.000 | 1.84667 | 23.79 |
| S6 | 205.069 | variable 1 | | |
| S7* | 16.767 | 3.800 | 1.58913 | 61.15 |
| S8* | −102.514 | 4.454 | | |
| S9 (ST) | ∞ | 0.800 | | |
| S10 | 2065.337 | 1.500 | 1.72000 | 41.98 |
| S11 | 10.833 | 5.200 | 1.49700 | 81.59 |
| S12 | −22.551 | 0.800 | | |
| S13 | 30.982 | 3.730 | 1.48749 | 70.42 |
| S14 | 1029.635 | variable 2 | | |
| S15* | −104.322 | 1.200 | 1.76802 | 49.24 |
| S16* | 27.665 | variable 3 | | |
| S17 | −74.947 | 2.230 | 1.61881 | 63.86 |
| S18* | −27.598 | variable 4 | | |
| S19 | ∞ | 2.000 | 1.51680 | 64.21 |
| S20 | ∞ | 0.558 | | |
| Image plane | | | | |

TABLE 6b

| Item | Wide angle position | Middle position | Telephoto position |
|---|---|---|---|
| Focal length | 16.500 | 26.500 | 48.497 |
| F-number | 3.59 | 4.61 | 6.49 |
| Half angle of view(°) | 43.59 | 29.07 | 16.57 |
| Image height | 14.250 | 14.250 | 14.250 |
| Overall lens length | 89.268 | 91.541 | 112.061 |
| BF (in air) | 20.025 | 22.425 | 44.798 |

TABLE 6c

| Variable distance | Wide angle position | Middle position | Telephoto position |
|---|---|---|---|
| d6 | 20.918 | 10.249 | 0.762 |
| d14 | 4.422 | 6.293 | 8.108 |
| d16 | 3.110 | 11.781 | 17.601 |
| d18 | 18.149 | 20.549 | 42.921 |

TABLE 6d

| Lens surface | K | A4 | A6 | A8 | A10 |
|---|---|---|---|---|---|
| S3 | 0 | 1.09207E−05 | −2.38358E−10 | 8.70393E−10 | −1.00456E−11 |
| S4 | 0 | −1.31438E−05 | −1.33050E−07 | 1.25840E−09 | −1.89108E−11 |
| S7 | 0 | −2.12033E−05 | −2.37949E−07 | 3.92621E−09 | −8.99280E−11 |
| S8 | 0 | 1.37854E−05 | −2.12930E−07 | 2.96535E−09 | −8.54743E−11 |
| S15 | 0 | 1.83260E−05 | −1.76437E−07 | 1.42427E−08 | −1.96087E−10 |
| S16 | 0 | 4.00964E−05 | −2.29874E−07 | 1.40155E−08 | −1.90432E−10 |
| S18 | 0 | −4.52742E−06 | −1.36490E−08 | −5.25177E−12 | −1.13011E−13 |

TABLE 6e

| condition | Sixth embodiment |
|---|---|
| M4/M2 (1) | 0.58 |
| f4/ft (2) | 1.42 |
| nd3 (3) | 1.768 |
| nd3 − nd4 (4) | 0.149 |
| M3/M2 (5) | 0.91 |
| |f3/ft| (6) | 0.58 |
| f2/ft (7) | 0.43 |
| f2b/f2 (8) | 0.41 |
| |f1/ft| (9) | 15.00 |

TABLE 6f

| | Wide angle position | Telephoto position |
|---|---|---|
| Sixth embodiment | 0.162 mm | 0.220 Mm |

Figure 18:
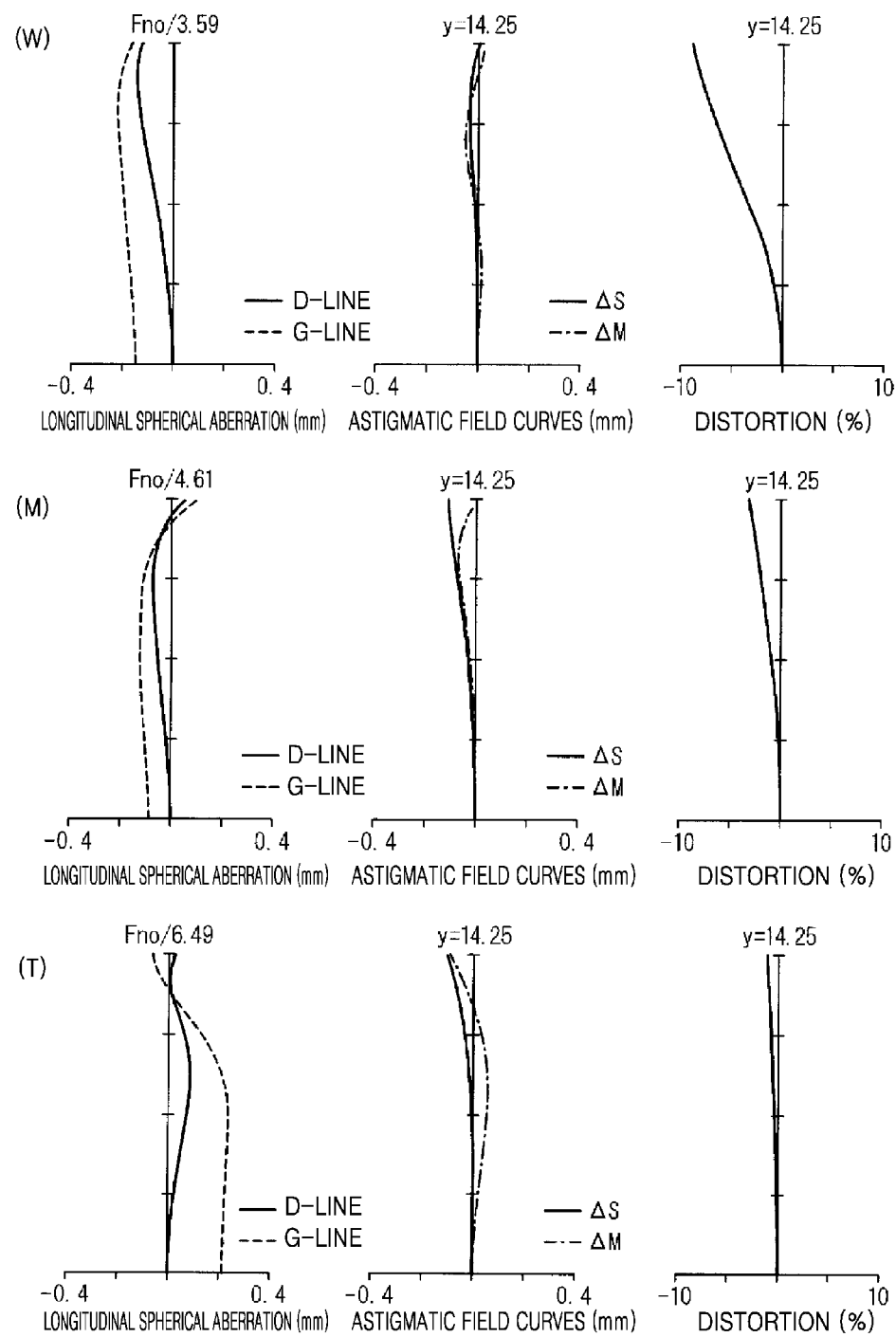
FIG. 18 illustrates spherical aberration, astigmatic field curves, and distortion of the zoom lens of FIG. 17 in a wide angle position (W), a middle position (M), and a telephoto position (T)
Figure 19B:
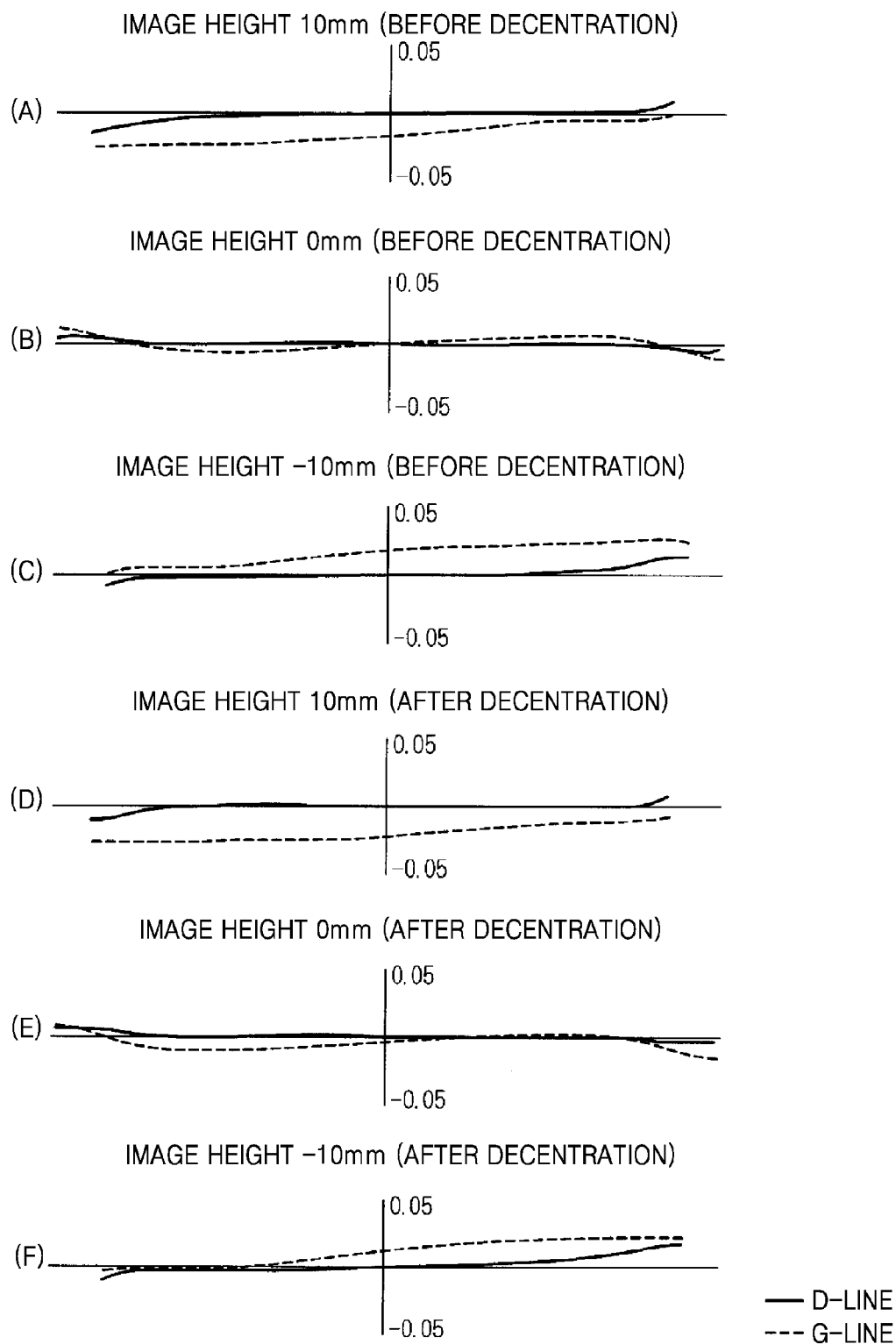
FIG. 19B illustrates lateral aberration of the zoom lens of FIG. 17 in a telephoto position (T)

FIG. 18 illustrates longitudinal aberration (spherical aberration, astigmatic field curves, and distortion) in the zoom lens 1700 of the sixth embodiment. FIGS. 19A and 19B illustrate lateral aberration in a wide angle position and a telephoto position of the zoom lens 1700 according to the sixth embodiment. Also, the same reference indicators are applied to both FIGS. 18, 19A, and 19B and FIGS. 3, 4A, and 4B.

The zoom lens 1700 according to the sixth embodiment satisfies the conditions as illustrated in Tables 6a through 6e. In the zoom lens 1700 according to the sixth embodiment, aberrations may be appropriately corrected as illustrated in FIGS. 18, 19A, and 19B.

Figure 20:
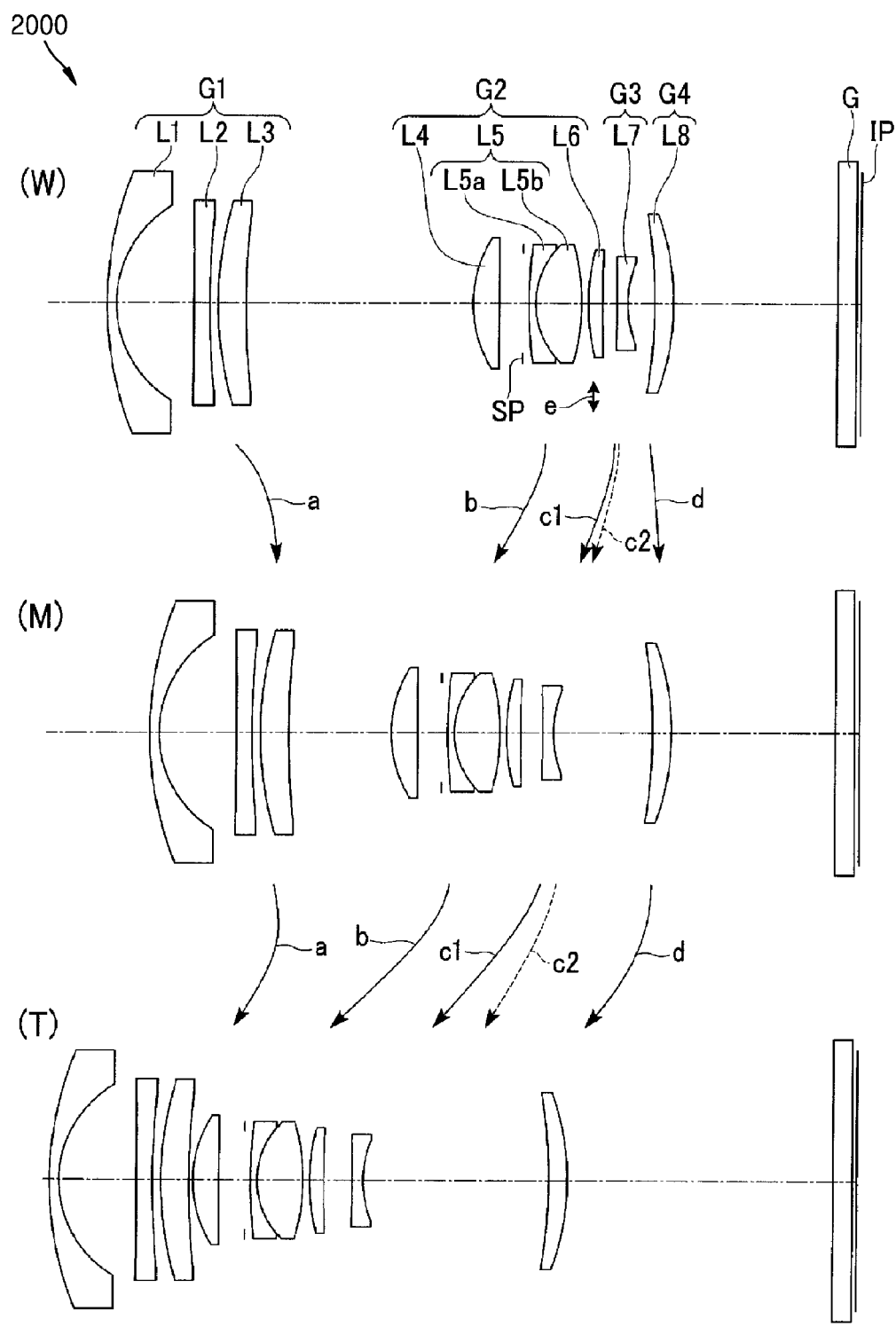
FIG. 20 illustrates arrangements of a zoom lens in a wide angle position (W), a middle position (M), and a telephoto position (T), according to another embodiment.

FIG. 20 illustrates arrangements (W), (M), and (T) of a zoom lens 2000 based on design data of the seventh embodiment. The zoom lens 2000 according to the seventh embodiment illustrated in FIG. 20 has generally the same lens structure as the zoom lens 100 illustrated in FIG. 1 and performs generally the same zooming, focusing, and image-shaking correction as the zoom lens 100 illustrated in FIG. 1. Thus, like reference numerals denote like elements in FIGS. 1 and 20, and the same arrow denotes the movement trace of the zoom lenses 100 and 2000 of FIGS. 1 and 20, respectively.

Tables 7a through 7f illustrate design data of the zoom lens 2000 illustrated in the seventh embodiment. Also, Tables 7a through 7f have the same reference indicators as in Tables 1a through 1f.

TABLE 7a

| Lens surface | r | d | nd | Nd |
|---|---|---|---|---|
| Object surface | ∞ | ∞ | | |
| S1 | 49.588 | 1.000 | 1.80401 | 46.57 |
| S2 | 12.765 | 8.704 | | |
| S3* | −450.000 | 1.620 | 1.69012 | 52.90 |
| S4* | 63.899 | 0.959 | | |
| S5 | 42.758 | 3.390 | 1.84667 | 23.79 |
| S6 | 198.647 | variable 1 | | |
| S7* | 13.387 | 3.220 | 1.58916 | 60.60 |
| S8* | −170.889 | 2.724 | | |
| S9 (ST) | ∞ | 0.800 | | |
| S10 | 47.254 | 0.600 | 1.72000 | 43.68 |
| S11 | 8.331 | 5.070 | 1.49700 | 81.59 |
| S12 | −23.148 | 0.800 | | |
| S13 | 25.881 | 1.490 | 1.48749 | 70.42 |
| S14 | 136.467 | variable 2 | | |
| S15* | −104.952 | 1.200 | 1.74320 | 49.30 |
| S16* | 15.985 | variable 3 | | |
| S17 | −39.540 | 2.000 | 1.72903 | 54.04 |
| S18* | −26.799 | variable 4 | | |
| S19 | ∞ | 2.000 | 1.51680 | 64.21 |
| S20 | ∞ | 0.558 | | |
| Image plane | | | | |

TABLE 7b

The zoom ratio is 2.94.

| Item | Wide angle position | Middle position | Telephoto position |
|---|---|---|---|
| Focal length | 16.500 | 26.500 | 48.508 |
| F-number | 3.55 | 4.39 | 6.20 |
| Half angle of view(°) | 43.47 | 28.59 | 16.42 |
| Image height | 14.250 | 14.250 | 14.250 |
| Overall lens length | 83.705 | 78.621 | 90.044 |
| BF (in air) | 20.352 | 20.013 | 31.304 |

TABLE 7c

| Variable distance | Wide angle position | Middle position | Telephoto position |
|---|---|---|---|
| d6 | 24.650 | 10.754 | 0.500 |
| d14 | 1.633 | 2.580 | 3.206 |
| d16 | 2.811 | 11.016 | 20.775 |
| d18 | 18.476 | 18.136 | 29.427 |

TABLE 7d

| Lens surface | K | A4 | A6 | A8 | A10 |
|---|---|---|---|---|---|
| S3 | 0 | −1.72903E−05 | 3.12806E−07 | −1.62631E−09 | 2.98365E−12 |
| S4 | 0 | −3.50497E−05 | 2.20597E−07 | −1.40520E−09 | −1.12369E−12 |
| S7 | 0 | −1.87600E−05 | −2.86071E−07 | 1.40639E−08 | −2.39214E−10 |
| S8 | 0 | 4.24345E−05 | −1.349080E−07 | 1.02746E−08 | −2.26790E−10 |
| S15 | 0 | 6.41462E−05 | −3.96609E−06 | 1.46384E−07 | −2.30636E−09 |
| S16 | 0 | 9.43203E−05 | −4.13263E−06 | 1.49624E−07 | −2.56402E−09 |
| S18 | 0 | −2.88243E−06 | −3.06502E−08 | 7.74928E−11 | −2.57697E−13 |

TABLE 7e

| condition | Seventh embodiment |
|---|---|
| M4/M2 (1) | 0.36 |
| f4/ft (2) | 2.20 |
| nd3 (3) | 1.743 |
| nd3 − nd4 (4) | 0.014 |
| M3/M2 (5) | 0.95 |
| |f3/ft| (6) | 0.38 |
| f2/ft (7) | 0.34 |
| $f_s/f_2$ (8) | 0.50 |
| $|f_1/f_r|$ (9) | 5.68 |

TABLE 7f

| | Wide angle position | Telephoto position |
|---|---|---|
| Seventh embodiment | 0.184 mm | 0.263 Mm |

Figure 21:
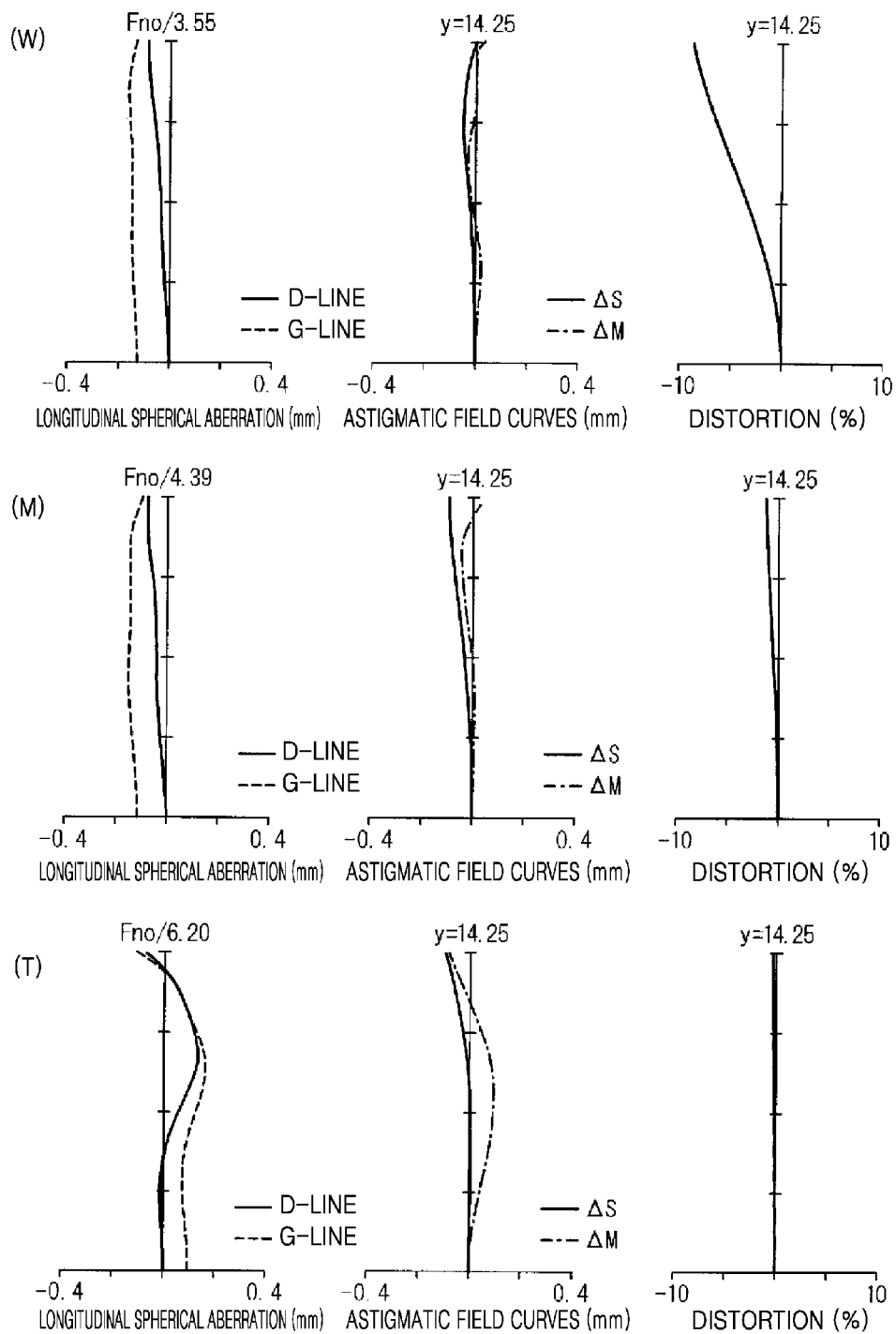
FIG. 21 illustrates spherical aberration, astigmatic field curves, and distortion of the zoom lens of FIG. 20 in a wide angle position (W), a middle position (M), and a telephoto position (T)

FIG. 21 illustrates longitudinal aberration (spherical aberration, astigmatic field curves, and distortion) in the zoom lens 2000 of the seventh embodiment. FIGS. 22A and 22B illustrate lateral aberration in a wide angle position and a telephoto position of the zoom lens 2000 according to the seventh embodiment. Also, the same reference indicators are applied to both FIGS. 21, 22A, and 22B and FIGS. 3, 4A, and 4B.

The zoom lens 2000 according to the seventh embodiment satisfies the conditions as illustrated in Tables 7a through 7e. In the zoom lens 2000 according to the seventh embodiment, aberrations may be appropriately corrected as illustrated in FIGS. 21, 22A, and 22B.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While various embodiments have been described with reference to the figures, it will be understood by those of ordinary skill in the art that various changes in form and details may be made therein without departing from the spirit and scope of the invention as defined by the following claims.

What is claimed is:

1. A zoom lens comprising, in an order from an object side:
   a first lens group that comprises at least two negative lenses and a single positive lens, the first lens group having a negative refractive power;
   a second lens group that comprises a plurality of lenses, at least one correction lens of the second lens group being movable in a surface that crosses an optical axis to perform image-shaking correction, the second lens group having a positive refractive power;
   a third lens group that comprises a single negative lens, the third lens group having a negative refractive power; and
   a fourth lens group having a positive refractive power,
   wherein intervals between the first, second, third, and fourth lens groups are changed during zooming from a wide angle position to a telephoto position, and each of the first, second, third, and fourth lens groups moves during zooming from a wide angle position to a telephoto position,
   and the zoom lens satisfies the following conditions:

$0.05 < M_4/M_2 < 0.8$, and $0.8 < f_4/f_t < 5.0$, where $M_2$ denotes an amount of movement of the second lens group in a direction toward the optical axis during zooming from the wide angle position to the telephoto position, $M_4$ denotes an amount of movement of the fourth lens group in a direction toward the optical axis during zooming from the wide angle position to the telephoto position, $f_4$ denotes a synthesis focal length of the fourth lens group, and $f_t$ denotes an overall focal length in the telephoto position.

2. The zoom lens of claim 1, wherein the correction lens, which is located most adjacent to an image side within the second lens group, is moved in the surface that crosses the optical axis to perform the image-shaking correction.

3. The zoom lens of claim 1, wherein the correction lens, which is located in a third position in an order from the object side, is moved in the surface that crosses the optical axis to perform the image-shaking correction.

4. The zoom lens of claim 1, wherein the negative lens of the third lens group is a biconcave lens.

5. The zoom lens of claim 4, wherein the negative lens of the third lens group has at least one aspherical surface.

6. The zoom lens of claim 1, wherein the fourth lens group comprises a single positive lens.

7. The zoom lens of claim 6, wherein the positive lens of the fourth lens group is a meniscus lens that is convex at an image side.

8. The zoom lens of claim 7, wherein the positive lens of the fourth lens group has at least one aspherical surface.

9. The zoom lens of claim 7, wherein the first lens of the second lens group is a biconvex lens and has at least one aspherical surface.

10. The zoom lens of claim 9, wherein the second lens of the second lens group is a cemented lens comprising in an order from the object side a negative lens and a positive lens.

11. The zoom lens of claim 9, wherein the zoom lens satisfies the following condition:

$2.0 < f_5/f_2 < 20.0$, where $f_5$ denotes a focal length of the second lens of the second lens group and $f_t$ denotes the overall focal length in the telephoto position.

12. The zoom lens of claim 6, wherein the zoom lens satisfies the following conditions:

$1.65 < nd_3$, and $0.005 < nd_3 - nd_4$, where $nd_3$ denotes a refractive index of the negative lens of the third lens group at a d-line and $nd_4$ denotes a refractive index of the positive lens of the fourth lens group at a d-line.

13. The zoom lens of claim 1, wherein the zoom lens satisfies the following condition:

$0.55 < M_3/M_2 < 1.0$, where $M_2$ denotes the amount of movement of the second lens group in the direction toward the optical axis during zooming from the wide angle position to the telephoto position and $M_3$ denotes an amount of movement of the third lens group in the direction toward the optical axis during zooming from the wide angle position to the telephoto position.

14. The zoom lens of claim 13, wherein the zoom lens satisfies the following condition:

$0.1 < |f_3/f_t| < 0.8$, where $f_3$ denotes a focal length of the third lens group and $f_t$ denotes the overall focal length in the telephoto position.

15. The zoom lens of claim 1, wherein the second lens group comprises in an order from the object side a first lens having a positive refractive power, a second lens having a positive refractive power, and a third lens having a positive refractive power.

16. The zoom lens of claim 15, wherein the zoom lens satisfies the following condition:

$$0.1 < f_2/f_t < 0.8,$$

where $f_2$ denotes a focal length of the second lens group and $f_t$ denotes the overall focal length in the telephoto position.

17. The zoom lens of claim 15, wherein an aperture stop is disposed between the first lens of the second lens group and the second lens of the second lens group.

18. The zoom lens of claim 1, wherein the first lens group comprises in an order from the object side a negative lens that is convex toward the object side, a biconcave negative lens, and a positive lens which is convex toward the object side.

19. The zoom lens of claim 18, wherein at least one of the lenses comprised in the first lens group is an aspherical lens.

20. The zoom lens of claim 18, wherein the zoom lens satisfies the following condition:

$$0.2 < |f_1/f_t| < 0.8,$$

where $f_1$ denotes a focal length of the first lens group and $f_t$ denotes the overall focal length in the telephoto position.

21. An electronic apparatus comprising:
a zoom lens; and
a solid-state imaging device that captures an image formed by the zoom lens;
wherein the zoom lens comprises, in an order from an object side:
a first lens group that comprises at least two negative lenses and a single positive lens, the first lens group having a negative refractive power;
a second lens group that comprises a plurality of lenses, at least one correction lens of the second lens group being movable in a surface that crosses an optical axis to perform image-shaking correction, the second lens group having a positive refractive power;
a third lens group that comprises a single negative lens, the third lens group having a negative refractive power; and
a fourth lens group having a positive refractive power;
wherein intervals between the first, second, third, and fourth lens groups are changed during zooming from a wide angle position to a telephoto position, and each of the first, second, third, and fourth lens group moves during zooming from a wide angle position to a telephoto position,
and the zoom lens satisfies the following conditions:

$$0.05 < M_4/M_2 < 0.8, \text{ and}$$

$$0.8 < f_4/f_t < 5.0,$$

where $M_2$ denotes an amount of movement of the second lens group in a direction toward the optical axis during zooming from the wide angle position to the telephoto position, $M_4$ denotes an amount of movement of the fourth lens group in a direction toward the optical axis during zooming from the wide angle position to the telephoto position, $f_4$ denotes a synthesis focal length of the fourth lens group, and $f_t$ denotes an overall focal length in the telephoto position.

* * * * *